(12) United States Patent
Novack et al.

(10) Patent No.: US 10,097,543 B2
(45) Date of Patent: *Oct. 9, 2018

(54) NETWORKED DEVICE ACCESS CONTROL

(71) Applicant: AT&T INTELLECTUAL PROPERTY I, L.P., Atlanta, GA (US)

(72) Inventors: Brian M. Novack, Saint Louis, MO (US); Stephanie Andrews, Dallas, TX (US); Aditya Arora, Johns Creek, GA (US); Emlyn C. Jeffrey, San Antonio, TX (US); Gary Smith, Dallas, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1 day.

This patent is subject to a terminal disclaimer.

(21) Appl. No.: 15/147,373

(22) Filed: May 5, 2016

(65) Prior Publication Data

US 2016/0248770 A1    Aug. 25, 2016

Related U.S. Application Data

(63) Continuation of application No. 14/088,841, filed on Nov. 25, 2013, now Pat. No. 9,363,264.

(51) Int. Cl.
*G06F 21/57* (2013.01)
*H04L 29/06* (2006.01)
(Continued)

(52) U.S. Cl.
CPC ........ *H04L 63/0861* (2013.01); *G06F 21/575* (2013.01); *G07C 9/00111* (2013.01);
(Continued)

(58) Field of Classification Search
CPC . H04L 63/0861; H04L 63/10; H04L 63/0853; G06F 21/32; G06F 21/34; G06F 21/575; G07C 9/00111; G07C 9/00904
(Continued)

(56) References Cited

U.S. PATENT DOCUMENTS 5,406,261 A    4/1995 Glenn
5,452,454 A *  9/1995 Basu ............... G06F 9/4416
                                              713/2
(Continued)

FOREIGN PATENT DOCUMENTS

CA    2272666    11/2000
CN    101588352    11/2009
(Continued)

OTHER PUBLICATIONS

Gray, "Something Wonderful this Way Comes", Computing in Science and Engineering, 2006, pp. 82-87.*
(Continued)

*Primary Examiner* — Luu T Pham
*Assistant Examiner* — Walter J Malinowski
(74) *Attorney, Agent, or Firm* — Greenblum & Bernstein, P.L.C.

(57) ABSTRACT

A computer apparatus is remotely initiated. Confirmation of a detected and authenticated presence of a user remote from the computer apparatus is detected and confirmed via a wireless network. Booting of the computer apparatus is initiated based on receiving confirmation of the detected and authenticated presence of the user remote from the computer apparatus. The computer apparatus is booted in a protected workstate that prevents access to the computer apparatus while the user is remote and until a local presence of the user is detected and authenticated. The computer apparatus is operable to be unprotected upon confirmation of the local presence of the user. The computer apparatus is also operable to be accessible to the user upon unprotecting the workstate of the computer apparatus.

17 Claims, 17 Drawing Sheets

(51) Int. Cl.
   *G07C 9/00* (2006.01)
   *G06F 21/34* (2013.01)
   *G06F 21/32* (2013.01)

(52) U.S. Cl.
   CPC .......... *G07C 9/00904* (2013.01); *H04L 63/10* (2013.01); *G06F 21/32* (2013.01); *G06F 21/34* (2013.01); *H04L 63/0853* (2013.01)

(58) Field of Classification Search
   USPC ..................................... 726/4–7; 713/2, 182
   See application file for complete search history.

(56) References Cited

U.S. PATENT DOCUMENTS

| | | | |
|---|---|---|---|
| 5,534,855 A * | 7/1996 | Shockley | G06F 21/31 340/5.52 |
| 5,577,210 A * | 11/1996 | Abdous | G06F 9/4416 709/219 |
| 5,578,991 A | 11/1996 | Scholder | |
| 5,781,724 A * | 7/1998 | Nevarez | G06F 21/31 726/17 |
| 5,938,771 A * | 8/1999 | Williams | G06F 1/3209 713/310 |
| 5,970,227 A | 10/1999 | Dayan | |
| 6,070,240 A | 5/2000 | Xydis | |
| 6,072,891 A | 6/2000 | Hamid | |
| 6,092,192 A | 7/2000 | Kanevsky | |
| 6,160,873 A * | 12/2000 | Truong | G06F 1/26 379/102.02 |
| 6,189,105 B1 | 2/2001 | Lopes | |
| 6,202,158 B1 | 3/2001 | Urano et al. | |
| 6,256,737 B1 | 7/2001 | Bianco | |
| 6,298,445 B1 | 10/2001 | Shostack | |
| 6,356,965 B1 | 3/2002 | Broyles et al. | |
| 6,633,905 B1 * | 10/2003 | Anderson | G06F 1/26 709/219 |
| 6,671,756 B1 * | 12/2003 | Thomas | G06F 3/023 710/220 |
| 6,735,695 B1 | 5/2004 | Gopalakrishnan | |
| 6,748,525 B1 * | 6/2004 | Hubacher | G06F 9/4416 709/220 |
| 6,859,527 B1 * | 2/2005 | Banks | H04L 29/06 370/352 |
| 6,973,587 B1 * | 12/2005 | Maity | G06F 11/1417 713/2 |
| 7,069,444 B2 | 6/2006 | Lowensohn | |
| 7,249,269 B1 | 7/2007 | Motoyama | |
| 7,378,939 B2 | 5/2008 | Sengupta | |
| 7,379,886 B1 * | 5/2008 | Zaring | G06Q 10/02 463/25 |
| 7,506,366 B1 | 3/2009 | Sze | |
| 7,546,638 B2 * | 6/2009 | Anderson | G06F 21/564 713/188 |
| 7,570,163 B2 | 8/2009 | Ruetschi | |
| 7,617,523 B2 | 11/2009 | Das | |
| 7,925,887 B2 | 4/2011 | Burton | |
| 7,997,482 B2 | 8/2011 | Kannan | |
| 8,149,089 B2 | 4/2012 | Lin | |
| 8,185,747 B2 | 5/2012 | Wood | |
| 8,225,380 B2 | 7/2012 | Moshir | |
| 8,294,552 B2 | 10/2012 | Beenau | |
| 8,407,768 B1 | 3/2013 | Hayter | |
| 8,407,773 B1 | 3/2013 | Hayter | |
| 8,443,437 B2 | 5/2013 | Srinivasa | |
| 8,462,994 B2 | 6/2013 | Ortiz | |
| 8,498,618 B2 | 7/2013 | Ben Ayed | |
| 8,522,019 B2 | 8/2013 | Michaelis | |
| 8,539,560 B2 * | 9/2013 | Angaluri | H04N 9/3194 434/314 |
| RE44,814 E * | 3/2014 | Perholtz | 379/38 |
| 8,676,273 B1 * | 3/2014 | Fujisaki | H04M 1/6505 379/142.06 |
| 9,058,466 B1 * | 6/2015 | Choksey | G06F 21/00 |
| 9,195,830 B2 * | 11/2015 | Sidle | G06F 21/305 |
| 9,213,820 B2 * | 12/2015 | Farraro | G06F 21/35 |
| 9,454,859 B2 * | 9/2016 | Roth | G07C 9/00111 |
| 2002/0055987 A1 * | 5/2002 | Tsujisawa | H04L 63/0428 709/219 |
| 2002/0103877 A1 | 8/2002 | Gagnon et al. | |
| 2002/0105425 A1 | 8/2002 | Holmes | |
| 2003/0037264 A1 * | 2/2003 | Ezaki | G06F 21/32 726/21 |
| 2003/0084342 A1 * | 5/2003 | Girard | G06F 21/305 726/4 |
| 2003/0095647 A1 | 5/2003 | Cromer et al. | |
| 2003/0097556 A1 * | 5/2003 | Gilbert | G06F 9/4405 713/2 |
| 2003/0200428 A1 * | 10/2003 | Chan | G06F 9/4416 713/1 |
| 2003/0200445 A1 * | 10/2003 | Park | G06F 21/34 713/185 |
| 2003/0217278 A1 * | 11/2003 | Kimura | G06F 3/0614 713/189 |
| 2003/0229774 A1 * | 12/2003 | Freeman | G06F 9/4406 713/1 |
| 2004/0003258 A1 | 1/2004 | Billingsley et al. | |
| 2004/0028061 A1 * | 2/2004 | Sawada | H04L 29/06 370/401 |
| 2004/0181695 A1 * | 9/2004 | Walker | G06F 21/35 726/4 |
| 2004/0185798 A1 * | 9/2004 | Ohtaki | G07C 9/00944 455/90.3 |
| 2004/0243747 A1 | 12/2004 | Rekimoto | |
| 2004/0249765 A1 * | 12/2004 | Leon | G06F 21/32 705/64 |
| 2005/0015606 A1 * | 1/2005 | Blamires | G06F 21/575 713/188 |
| 2005/0021645 A1 | 1/2005 | Kulkarni | |
| 2005/0066000 A1 * | 3/2005 | Liaw | G06F 13/385 709/204 |
| 2005/0110618 A1 * | 5/2005 | Creff | G06F 1/189 340/333 |
| 2005/0132229 A1 * | 6/2005 | Zhang | H04L 12/4641 726/4 |
| 2005/0168372 A1 * | 8/2005 | Hollemans | G08C 17/02 341/176 |
| 2005/0204307 A1 | 9/2005 | Nadal | |
| 2005/0210270 A1 * | 9/2005 | Rohatgi | G06F 21/32 713/186 |
| 2006/0012577 A1 * | 1/2006 | Kyrola | G06F 3/0416 345/173 |
| 2006/0047946 A1 * | 3/2006 | Keith, Jr. | H04L 67/34 713/2 |
| 2006/0056397 A1 * | 3/2006 | Aizu | H04L 12/66 370/352 |
| 2006/0117172 A1 * | 6/2006 | Zhang | G06F 9/4416 713/2 |
| 2006/0149414 A1 | 7/2006 | Archacki | |
| 2006/0161783 A1 | 7/2006 | Aiken | |
| 2006/0168178 A1 * | 7/2006 | Hwang | H04L 12/2803 709/223 |
| 2006/0235936 A1 * | 10/2006 | Lei | G06F 19/321 709/208 |
| 2006/0253330 A1 * | 11/2006 | Maggio | G06Q 30/02 705/14.2 |
| 2006/0253711 A1 * | 11/2006 | Kallmann | B60K 28/063 713/186 |
| 2006/0271773 A1 * | 11/2006 | Marquiz | G06F 11/2294 713/1 |
| 2006/0290519 A1 * | 12/2006 | Boate | G07C 9/00111 340/573.4 |
| 2007/0050634 A1 * | 3/2007 | Makimoto | G06F 21/32 713/182 |
| 2007/0057763 A1 | 3/2007 | Blattner et al. | |
| 2007/0061587 A1 * | 3/2007 | Kim | G06F 21/575 713/182 |
| 2007/0063969 A1 | 3/2007 | Wright | |
| 2007/0067445 A1 * | 3/2007 | Vugenfirer | H04L 67/141 709/224 |

(56) References Cited

U.S. PATENT DOCUMENTS

| | | |
|---|---|---|
| 2007/0094708 A1 | 4/2007 | Hess |
| 2007/0130457 A1* | 6/2007 | Kamat ............... H04L 63/0281 713/151 |
| 2007/0130617 A1 | 6/2007 | Durfee et al. |
| 2007/0144723 A1* | 6/2007 | Aubertin ............. B60H 1/00642 165/202 |
| 2007/0177771 A1* | 8/2007 | Tanaka .................. A61B 5/117 382/115 |
| 2008/0065276 A1 | 3/2008 | Sorensen |
| 2008/0109895 A1 | 5/2008 | Janevski |
| 2008/0119994 A1* | 5/2008 | Kameyama ........... B60W 40/08 701/48 |
| 2008/0183316 A1 | 7/2008 | Clayton |
| 2008/0229091 A1* | 9/2008 | Abu-Akel ............... H04L 12/12 713/2 |
| 2008/0253624 A1* | 10/2008 | Wong ........................ G06F 1/26 382/124 |
| 2008/0281472 A1 | 11/2008 | Podgorny |
| 2008/0296371 A1 | 12/2008 | Lu et al. |
| 2009/0031013 A1* | 1/2009 | Kunchipudi ......... G06F 9/4416 709/222 |
| 2009/0037978 A1 | 2/2009 | Luque et al. |
| 2009/0083534 A1 | 3/2009 | Challener et al. |
| 2009/0158423 A1 | 6/2009 | Orlassino |
| 2009/0177892 A1 | 7/2009 | Steeves |
| 2009/0216587 A1 | 8/2009 | Dwivedi |
| 2009/0222901 A1 | 9/2009 | Schneider |
| 2009/0235081 A1* | 9/2009 | Hamid ............... G06Q 20/3223 713/176 |
| 2009/0256677 A1* | 10/2009 | Hein ..................... B60R 25/00 340/5.72 |
| 2009/0287938 A1* | 11/2009 | Prakash ............... G06F 21/575 713/186 |
| 2009/0319782 A1* | 12/2009 | Lee ........................ G06F 21/34 713/156 |
| 2010/0017589 A1* | 1/2010 | Reed .................... G06F 11/1417 713/2 |
| 2010/0064354 A1 | 3/2010 | Irvine |
| 2010/0083360 A1 | 4/2010 | Zhang |
| 2010/0169677 A1* | 7/2010 | Madhusoodanan ......................... H04L 12/4625 713/310 |
| 2010/0312600 A1 | 12/2010 | Motoyama |
| 2011/0001827 A1 | 1/2011 | Ortiz |
| 2011/0029351 A1* | 2/2011 | Intemann ............... G06Q 10/10 705/7.37 |
| 2011/0040933 A1* | 2/2011 | Swindell ............... G06F 21/305 711/104 |
| 2011/0055434 A1* | 3/2011 | Pyers ................... G06F 1/3203 710/14 |
| 2011/0083003 A1* | 4/2011 | Jaber ................... G06F 21/335 713/2 |
| 2011/0099616 A1* | 4/2011 | Mazur ................. H04L 63/0846 726/7 |
| 2011/0119756 A1* | 5/2011 | McClusky ........... G06F 21/6245 726/17 |
| 2011/0125990 A1* | 5/2011 | Khosravi ............. G06F 9/4416 713/2 |
| 2011/0246757 A1* | 10/2011 | Prakash ................ G06F 21/305 713/2 |
| 2011/0314530 A1 | 12/2011 | Donaldson |
| 2011/0314539 A1* | 12/2011 | Horton ..................... G06F 21/35 726/20 |
| 2012/0030752 A1* | 2/2012 | Bruno ................... G06F 1/3231 726/16 |
| 2012/0036569 A1* | 2/2012 | Cottrell ................. G06F 21/41 726/7 |
| 2012/0131681 A1* | 5/2012 | Layson ................. G06F 21/125 726/28 |
| 2012/0179904 A1* | 7/2012 | Dunn .................... G06F 21/575 713/155 |
| 2012/0204245 A1 | 8/2012 | Ting |
| 2012/0207299 A1 | 8/2012 | Hattori |
| 2012/0217303 A1 | 8/2012 | Krawczewicz et al. |
| 2012/0233674 A1* | 9/2012 | Gladstone ............... H04L 9/085 726/6 |
| 2012/0233683 A1 | 9/2012 | Ibrahim |
| 2012/0297467 A1* | 11/2012 | Carper .................. H04L 9/3226 726/7 |
| 2012/0304166 A1* | 11/2012 | Gu ........................ G06F 9/4401 717/174 |
| 2012/0317630 A1 | 12/2012 | Goldberg |
| 2013/0024334 A1 | 1/2013 | Kozlay |
| 2013/0033459 A1 | 2/2013 | Guo et al. |
| 2013/0097682 A1* | 4/2013 | Zeljkovic ............... H04L 9/3231 726/7 |
| 2013/0099940 A1* | 4/2013 | Protopapas ........ G07C 9/00087 340/904 |
| 2013/0159690 A1* | 6/2013 | Tsukamoto ............... G06F 1/26 713/2 |
| 2013/0169541 A1* | 7/2013 | Cabos ..................... B64D 43/00 345/168 |
| 2013/0176107 A1 | 7/2013 | Dumas |
| 2013/0211623 A1* | 8/2013 | Thompson ............. G07C 5/008 701/2 |
| 2013/0232425 A1 | 9/2013 | Lippmann et al. |
| 2013/0244772 A1 | 9/2013 | Weber |
| 2014/0053256 A1* | 2/2014 | Soffer .................... G06F 21/34 726/9 |
| 2014/0091903 A1 | 4/2014 | Birkel et al. |
| 2014/0139863 A1 | 5/2014 | Harada |
| 2014/0181925 A1* | 6/2014 | Smith .................... G06F 21/45 726/6 |
| 2014/0273963 A1* | 9/2014 | Su ........................ H04W 12/06 455/411 |
| 2014/0282877 A1 | 9/2014 | Mahaffey |
| 2014/0289827 A1* | 9/2014 | Tang ...................... H04L 63/08 726/6 |
| 2014/0289853 A1* | 9/2014 | Teddy ................. H04L 63/1416 726/23 |

FOREIGN PATENT DOCUMENTS

| | | |
|---|---|---|
| EP | 2634723 | 9/2013 |
| JP | 2005-242677 | 9/2005 |
| JP | 2009296057 A * | 12/2009 |
| KR | 20100033626 A * | 3/2010 |
| WO | WO-03067544 A1 * | 8/2003 ............. G08C 17/02 |

OTHER PUBLICATIONS

Harmer, "An Artificial Immune System Architecture for Computer Security Applications", IEEE Transactions on Evolutionary Computation, Vo. 6, No. 3, Jun. 2002, pp. 252-280.*

Jea, "Context-aware Access to Public Shared Devices", HealthNet'07, Jun. 11, 2007, pp. 13-18.*

England, "A Trusted Open Platform", IEEE Computer Society, Jul. 2003, pp. 55-62.*

Sailer, "Attestation-based Policy Enforcement for Remote Access", CCS'04, Oct. 25-29, 2004, pp. 308-317.*

Sailer, Reiner, and James R. Giles. "Pervasive authentication domains for automatic pervasive device authorization." In Pervasive Computing and Communications Workshops, 2004. Proceedings of the Second IEEE Annual Conference on, pp. 144-148. IEEE, 2004. (Year: 2004).*

Chhabra, Siddhartha, Brian Rogers, Yan Solihin, and Milos Prvulovic. "SecureME: a hardware-software approach to full system security." In Proceedings of the international conference on Supercomputing, pp. 108-119. ACM, 2011. (Year: 2011).*

Kim, "Multimedia, Computer Graphics, and Broadcasting", International Conference, Korea, Dec. 2011, 375 pages.

Micklei, "Internet-Integrate Building Control: Leaving the Lab-Robust, Scalable and Secure", IEEE, 2001, pp. 306-315.

Kalamandeen et al. "Ensemble: cooperative proximity-based authentication." Proceedings of the 8th international conference on Mobile systems, applications, and services. ACM, 2010. Downloaded from the internet at sysweb.cs.toronto.edu/publication_files/181/ensemble.pdf.

(56) References Cited

OTHER PUBLICATIONS

Bardram et al. "Context-aware user authentication—supporting proximity-based login in pervasive computing." UbiComp 2003: Ubiquitous Computing. Springer Berlin Heidelberg, 2003. Downloaded from the internet at pdf.aminer.org/000/256/875/context_aware_user_authentication_supporting_proximity_based_login_in_pervasive.pdf.

Aitenbichler et al. "Proximity-Based Authentication for Windows Domains." UbiComp 2007 Workshop Proceedings. 2007. Downloaded from the internet at atlas.tk.informatik.tu-darmstadt.de/Publications/2007/aitenbichler07proximity.pdf.

Corner et al. "Zero-interaction authentication." Proceedings of the 8th annual international conference on Mobile computing and networking. ACM, 2002. Downloaded from the internet at sigmobile.org/awards/mobicom2002-student.pdf.

\* cited by examiner

Automated Login Memory Arrangement 1300

NETWORKED DEVICE ACCESS CONTROL

CROSS-REFERENCE TO RELATED APPLICATIONS

The present application is a continuation application of pending U.S. patent application Ser. No. 14/088,841, filed on Nov. 25, 2013, the disclosure of which is expressly incorporated herein by reference in its entirety.

BACKGROUND

1. Field of the Disclosure

The present disclosure relates to the fields of computer security and time management. More particularly, the present disclosure relates to securely enabling remote computer logins.

2. Background Information

Users spend time waiting for computers and applications to start up and login. Time spent waiting could be avoided if computers were always left on and applications always left logged in. However, many users will not leave computers on and applications logged in due to concerns such as security, energy costs, the possibility of electrical fires occurring, and so on.

DETAILED DESCRIPTION

In view of the foregoing, the present disclosure, through one or more of its various aspects, embodiments and/or specific features or sub-components, is thus intended to bring out one or more of the advantages as specifically noted below.

Figure 1:
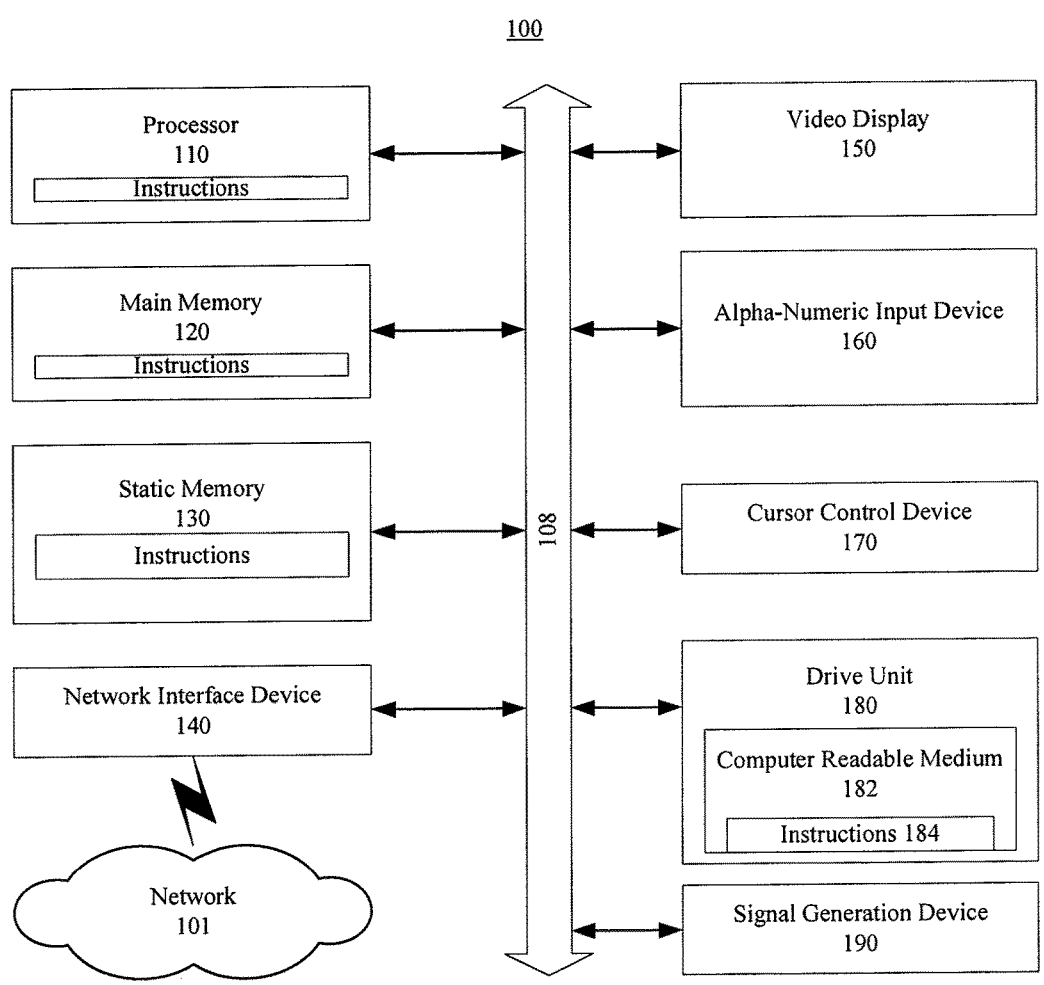
FIG. 1 shows an exemplary general computer system that includes a set of instructions for networked device access control, according to an aspect of the present disclosure.

FIG. 1 is an illustrative embodiment of a general computer system, on which a method of networked device access control can be implemented, and which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system 100 may operate in the capacity of a server or as a client user computer in a server-client user network environment, or as a peer computer system in a peer-to-peer (or distributed) network environment. The computer system 100 can also be implemented as or incorporated into various devices, such as a stationary computer, a mobile computer, a personal computer (PC), a laptop computer, a tablet computer, a wireless smart phone, a personal digital assistant (PDA), a communications device, a control system, a web appliance, a workstation computer, a checkpoint control system, a server, an access controller, an authentication system controller, a control computer, a biometric input device, an electronic card reader, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen or speech input with speech recognition, and a cursor control device 170, such as a mouse or touch-sensitive input screen or pad. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120, the static memory 130, and the processor 110 also may be or may include computer-readable media that are tangible and non-transitory during the time instructions 184 are stored therein. As used herein, the term "non-transitory" is meant only to be interpreted consistent with and in a manner that would be understood by one of ordinary skill in the art, and not as an eternal characteristic of something that would last forever. The term "non-transitory" specifically disavows fleeting characteristics such as transitory characteristics of a particular carrier wave or signal or other forms that exist only briefly in any place or time.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations. Nothing in the present application should be interpreted as being implemented or implementable solely with software and not hardware such as a tangible processor and tangible memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140. The computer-readable medium 182 or any other computer-readable medium contemplated herein may be a tangible machine or article of manufacture that is tangible and non-transitory for a period of time during which instructions and/or data are stored therein or thereon.

Figure 2:
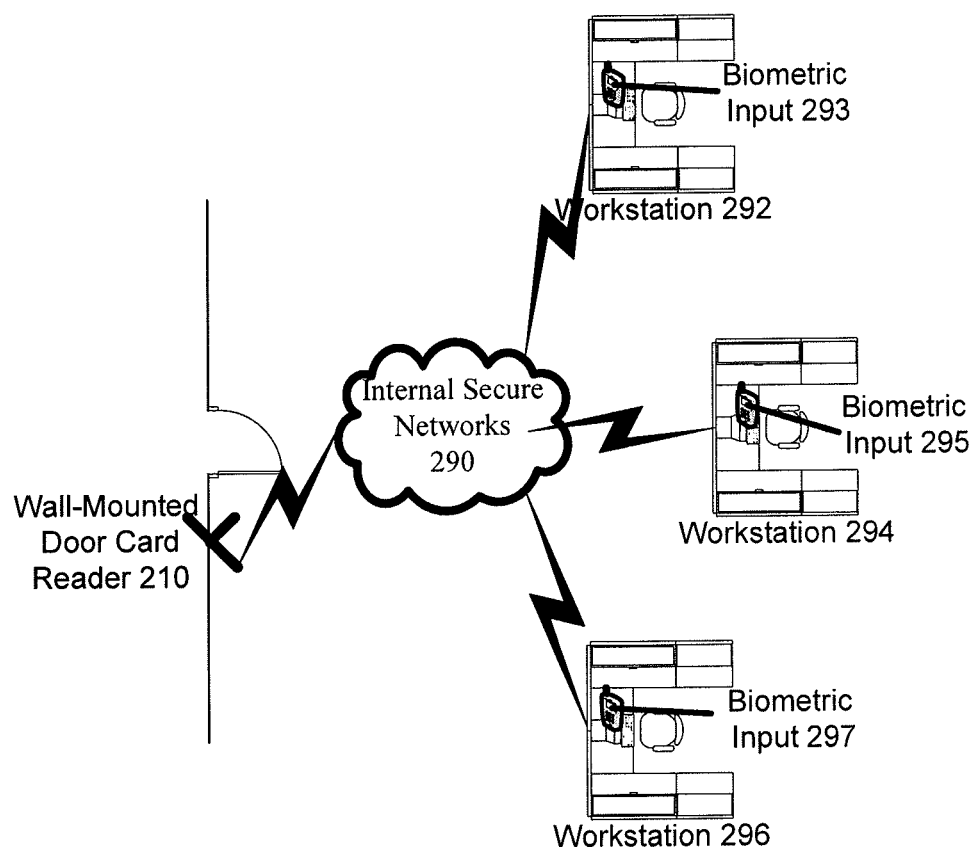
FIG. 2 shows an exemplary system for networked device access control, according to an aspect of the present disclosure.

FIG. 2 shows an exemplary system for networked device access control, according to an aspect of the present disclosure. In the embodiment of FIG. 2, a user enters a facility and presents identity information used to confirm the user's identity. In FIG. 2, the exemplary mechanism used to present identity information is wall-mounted door card reader 210. However, a checkpoint may be placed at any entrance to a facility, including a parking lot checkpoint, a building entrance checkpoint, an internal doorway or hallway checkpoint, or any other type of checkpoint known where a user might be expected to present identity information to confirm the user's identity.

The identity information presented in FIG. 2 may be a smart identification card with electronic information stored thereon. The smart identification card is swiped at the wall-mounted door card reader 210. In other embodiments, the identity information also may be biometric information, such as a fingerprint, voice sample, or eye scan, and such biometric information is obtained by a biometric sample or scan result. That is, instead of a wall-mounted door card reader 210, the checkpoint may check user identities using a fingerprint or eye scanner, or a voice input, or other mechanisms that can be used to obtain biometric information from a user.

The identity information may be used to authenticate the user's identity, such as to confirm a purported identity claimed by the user. The identity information may also be used to initially identify the user, such as when no purported identity is accepted from the user. Such an initial identification may be obtained, for example, from possession of biometric characteristics, or from possession of an item such as an electronic card or token that is taken to correspond to one and only one person. For example, an identification may be a token, the possession alone of which can be taken to identify an individual without the individual otherwise presenting a purported identity. In FIG. 2, the user is prohibited, or at least restrained, from passing the checkpoint unless the user's identity is established and the user is authorized to pass the checkpoint.

In the embodiment of FIG. 2, the wall-mounted door card reader 210 sends a signal across an internal secure network 290 when the user identity is confirmed. The signal sent by the wall-mounted door card reader 210 is sent to workstation 292, workstation 294, and/or workstation 296. The signal prompts a computer at the appropriate workstation 292, 294 or 296 to power-up, login the user, and/or begin activating applications on the computer for the user. The prompt in this embodiment and any other described herein may include an address such as a workstation name, a network name, an internet protocol (IP) address or a unique number assigned to a computer workstation. The prompt in this embodiment and any other described herein may also include a "wake up" command, followed by an instruction to log-in. The computer is powered up and/or logged in in a protected state, such as in a state where the screen on a computer monitor is locked/frozen or made blank/empty, or where a keyboard and/or mouse is frozen, or where the computer is otherwise prevented from accepting input and/or providing output.

While the user is travelling between the wall-mounted door card reader 210 and the appropriate workstation 292, 294 or 296, the computer at the workstation is powered-up and/or logged on, and/or applications on the workstation are activated and logged on. Therefore, when the user arrives at the workstation 292, 294 or 296, the workstation is ready for use, or already on the way to being ready for use.

In FIG. 2, another security input device is associated with each workstation 292, 294 and 296. Biometric inputs 293, 295 and 297 are devices or device accessories used to accept a fingerprint, hand print, eye scan, voice print, or other form of biometric input from the user. Therefore, before the workstation 292, 294, 296 is unlocked and placed in an unprotected state, the user is again identified, or the user's identity is again authenticated via, in one embodiment, the biometric input 293, 295, or 297, respectively. Only when the user is identified or authenticated is the computer at the workstation 292, 294 or 296 made available to the user. The term unprotect in all forms used herein describes actions to reduce or eliminate protections of a computer apparatus as described herein, such as unlocking and otherwise unfreezing inputs and/or outputs, and other actions understood to reduce or eliminate protections of a computer apparatus in an existing protected state.

In FIG. 2, the biometric inputs 293, 295 or 297 may be components integrated with workstations 292, 294, 296. As an example, a computer keyboard or monitor may have integrated therein a fingerprint scanner on which a user can press or swipe a specified finger so that an image can be taken. Alternatively, the biometric inputs 293, 295 or 297 may be separate devices connected to or in direct communication with the workstations 292, 294, 296. For example, biometric inputs may be separate fingerprint scanning devices that are connected to the workstations 292, 294, 296 by USB cords.

In an embodiment, the remote checkpoint security embodied by the wall-mounted door card reader 210 and the local workstation security embodied by the biometric inputs 293, 295, 297 may use the same kind of input, such as a smart card with electronic data, or biometric data provided by the user. The remote checkpoint security and the local workstation security may also both send in common input from the user to the same system that identifies the user or authenticates the user's identity. That is, security checks may be coordinated in the embodiment of FIG. 2, so that the same system confirms the user identification both remotely and locally. Additionally, the same system may confirm the user identification the same way, by for example accepting a fingerprint input from the same finger or accepting a swipe of the same electronic smart card, both locally and remotely.

Additionally, a user may be prevented from accessing a workstation if the user has not remotely been authenticated, such as at a manned security desk. In this way, an impersonator may be prevented from masquerading as an authorized user and only starting-up or logging-in to a workstation locally without being authenticated remotely at a checkpoint.

In FIG. 2, the wall-mounted door card reader 210 or other checkpoint security apparatus is remote from the workstations 292, 294, 296. As noted, the checkpoint security apparatus may be at an entrance to a parking lot, at a roadway entrance to a facility with multiple buildings, at a building entrance, or at a hallway or doorway entrance. Thus, when the user is arriving in the general vicinity of the facility with the workstation 292, 294 or 296 used by the user, the user is identified, and the confirmed remote physical presence of the user is used to begin powering up and/or logging on the computer at the workstation 292, 294 or 296, and/or logging on to individual applications on the computer at the workstation.

The internal secure networks 290 may be wired or wireless local area networks. The internal secure networks 290 may include a wireless fidelity (WiFi) network, or a wired-only broadband local area network. The internal secure networks 290 may also include a portion that is a virtual private network that uses public network resources. The internal secure networks 290 may also consist of something as simple as a USB connection between a checkpoint intake and a workstation 292, 294, or 296. However, internal secure networks 290 may also include or be coupled to one or more individual computer controllers that control the checkpoint (e.g., door unlock and lock) for a facility, that control access (on/off, operating system login, application login) for the workstations 292, 294, 296, and that control the local security input devices or accessories for the workstations 292, 294, 296. Thus, a wide variety of systems are included in the present disclosure, including direct connections, and coordinated and controlled connections with one or even more than one computer controllers.

An example of a facility that can use the system shown in FIG. 2 is a call center, such as a 911 center. The system can also be used in office buildings, schools, government administrative buildings, and military and police installations. As an example, a lobby or parking structure entrance at a midrise or high-rise building may contain electronic card readers, or fingerprint readers, and the confirmed identification of employees of one or more entities in the building can be used to prepare the employee computers before the employees arrive at their offices.

Figure 3:
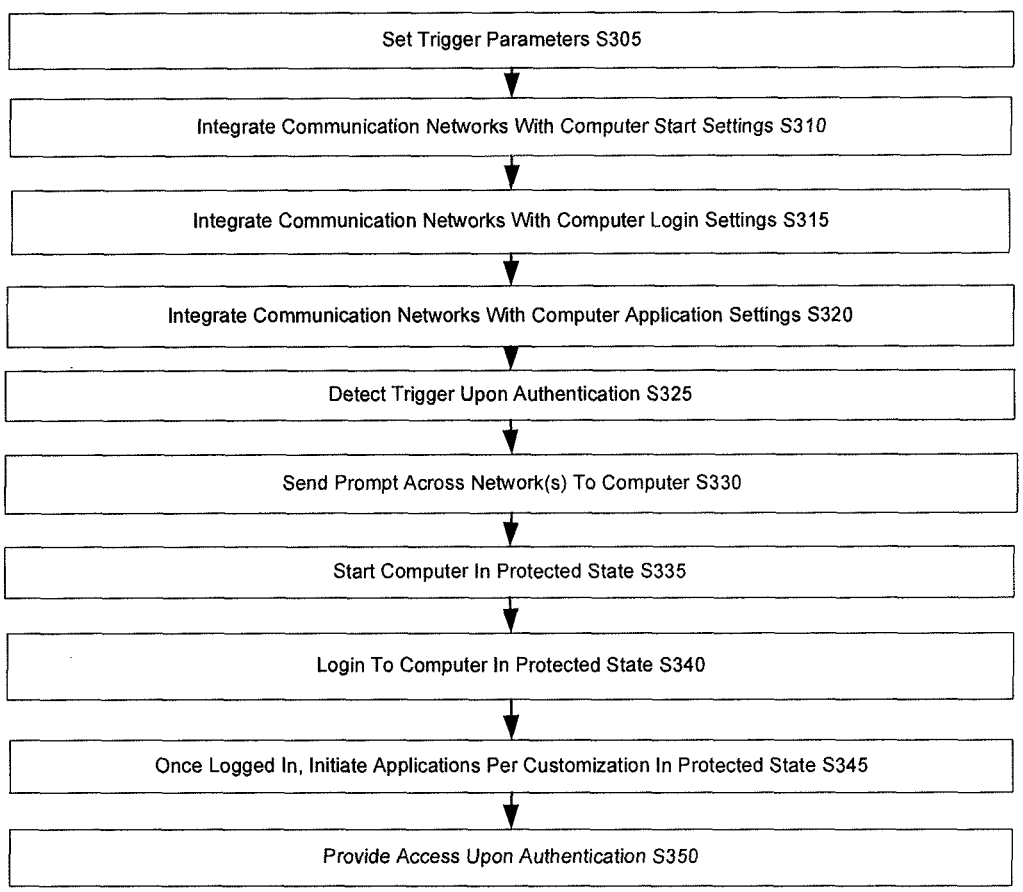
FIG. 3 shows an exemplary process for networked device access control, according to an aspect of the present disclosure.

FIG. 3 shows an exemplary process for networked device access control, according to an aspect of the present disclosure. As shown, the process starts with trigger parameters being set for triggers at S305. Triggers may be set at, for example, a checkpoint security input. A trigger may be set for an identity detection, or a verified identity check for a particular user, such as when a user swipes an electronic identification card at an electronic card reader. The trigger parameters may be set for when the user's identity is confirmed at a particular place, or within a particular range. The trigger may then be used to correlate the user's identity with the user's workstation, the user's username and password for accessing the workstation, and a set of one or more applications to be activated on the workstation, as well as usernames and passwords for each application to be activated. The trigger results in a prompt being sent across the network to turn on, and/or login to a computer workstation such as computer workstation 292, 294, 296 in FIG. 2, and/or to activate and login to one or more applications implemented on the computer workstation.

At S310, communications networks are integrated with computer start settings. For example, an on/off circuit for any computer workstation 292, 294, 296 in FIG. 2 is integrated so as to be set to "on" when instructed over internal secure networks 290. A checkpoint identity system such as wall-mounted door card reader 210 in FIG. 2 sends the "on" signal to a designated workstation 292, 294, 296 when the corresponding user identity is confirmed. The trigger is used to correlate the identity with the workstation, so the checkpoint system used to authenticate the user is integrated on the network with the workstation that is turned on when the user is authenticated.

At S315, communications networks are integrated with computer login settings. For example, a username and password for an operating system on a particular workstation 292, 294, 296 in FIG. 2 is associated with a particular user, and the login information (username/password) are integrated so as to be input when instructed over internal secure networks 290. The checkpoint identity system such as wall-mounted door card reader 210 in FIG. 2 sends the login information to the designated workstation 292, 294, 296 when the corresponding user identity is confirmed, and after the workstation is turned "on" if appropriate. The login information is automatically entered into the appropriate window entries on a start screen, and then a confirmed "entry" signal is entered to complete the initial operating system login for the designated workstation.

At S320, communications networks are integrated with computer application settings. For example, a list of particular applications used by a particular user are associated with the particular user and a particular workstation, and the particular applications and any associated login information (username/password) is integrated so as to be input when instructed over internal secure networks 290. The checkpoint identity system such as wall-mounted door card reader 210 in FIG. 2 processes the list of particular applications, and sends instructions to activate and login to the particular applications on a particular workstation 292, 294, 296 when the corresponding user identity is confirmed, and after the workstation is turned "on" and logged in if appropriate.

At S325, a trigger is detected upon authentication of a particular user. For example, the trigger is set to alert when a particular user swipes an electronic identification card through a wall-mounted door card reader 210 in FIG. 2. At S330, a prompt is sent across a local network to a specified computer workstation. The specified computer workstation is started in a protected state based on the prompt at S335. The specified computer workstation is logged in in a protected state at S340. Once logged in, applications are initiated per customization in a protected state at S345. For example, a particular user may be associated with a list of applications including a timekeeper application, a language translation application, and a word processing application, and each of these applications may be activated and logged into in a protected state at S345.

At S350, access is provided to the user upon authentication. Here, for example, the user arrives at the specified workstation some time after passing the remote checkpoint, and the user will find the workstation started, logged in, and with activated applications. The user again provides a purported identity and authentication information such as an electronic identification card, and upon authentication the user can access the workstation and applications.

The embodiments of FIGS. 2 and 3 are shown as relatively simple examples of remote and local authentication used to access workstation computers as described. However, as described herein, additional centralized controllers may be provided to coordinate the remote and local authentication, and the access controls. For example, a security service either internal to a facility or even a centralized security service external to a facility can be used to authenticate users, based on the information presented remotely at a checkpoint and locally at a workstation computer. For example, smart card information may be sent over a secure network to a security service, and the security service may instruct the workstation computer to start up and/or login. Additionally, an access control system may be provided, so as to control access to one or more workstations such as in a call center. The access control system may be provided together with a central independent security service, or alone to provide access to workstation computers in coordination only with checkpoint security systems such as wall-mounted door card reader 210.

Figure 4:
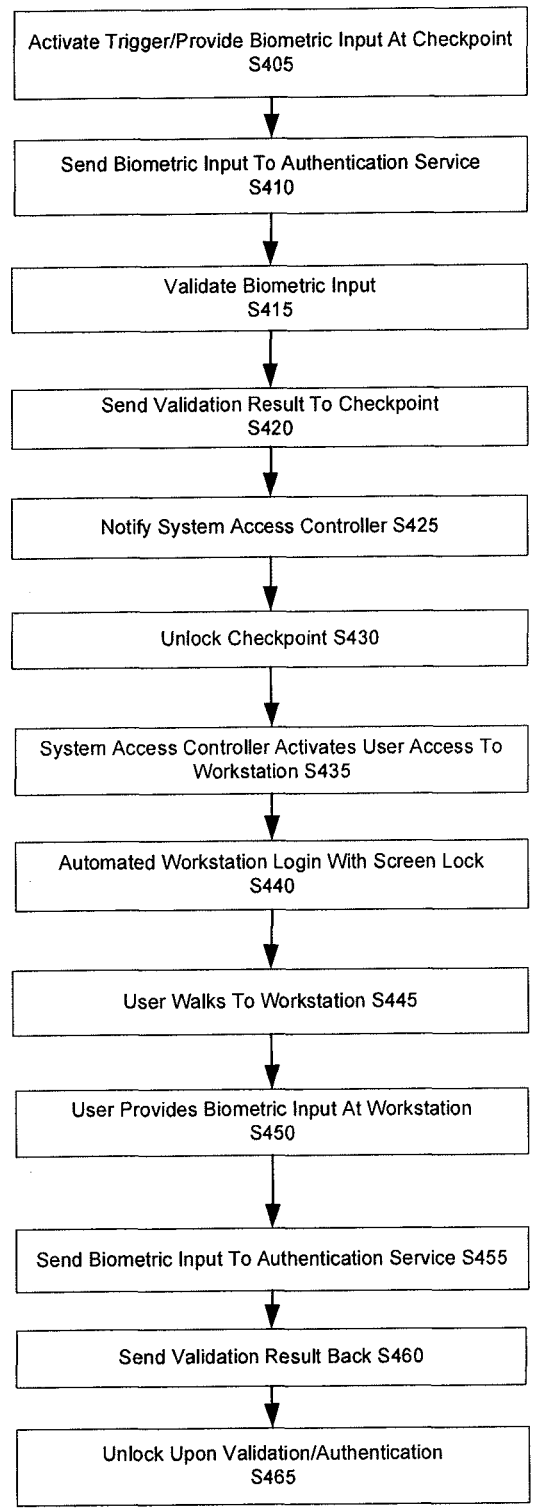
FIG. 4 shows an exemplary process for networked device access control, according to an aspect of the present disclosure.

FIG. 4 shows an exemplary process for networked device access control, according to an aspect of the present disclosure. At S405, a trigger is activated and biometric input is provided at a checkpoint. In the embodiment of FIG. 4, the biometric input may be an iris scan, a fingerprint or palm scan, a voice input, or another form of biometric input. The biometric input is sent alone or along with a user's purported identification to an authentication service at S410. If sent alone, the biometric input can be used to provide the initial identification of the user, whereas if sent with a purported identification the biometric sample can be used to authenticate the biometric sample. An authentication service validates/authenticates whether the user is who the user is purported to be at S415. For example, the authentication service may compare the obtained biometric sample or scan with a registered biometric sample or scan from the user. As noted herein, an authentication service may be provided locally at a facility or even immediately on a checkpoint system, or may be provided external to the checkpoint system or even external to the facility. At S420, the validation/authentication result is sent to the checkpoint when the authentication service is not integrated with the checkpoint.

At S425, if the user is authenticated, a system access controller is notified. The user is allowed to pass the checkpoint at S430 when the checkpoint is unlocked. The system access controller may be a server that controls on/off and user login to operating systems and applications at workstations. The system access controller may also maintain application lists for particular users. The system access controller selectively turns on and/or logs in particular users to particular workstations used by the users when notified that the users have been authenticated at e.g., an entrance checkpoint to a facility.

At S435, the system access controller activates user access to the specified workstation, and at S440, the system access controller sends workstation login information to login to the workstation in a protected setting such as with screen lock. At S445, the user walks to the workstation, and at S450 the user again provides biometric input to a biometric input at the workstation. The biometric input is again sent to the authentication service at S455, and a validation result is sent back to the workstation at S460. The computer at the workstation is unlocked upon validation/authentication at S465.

Figure 5:
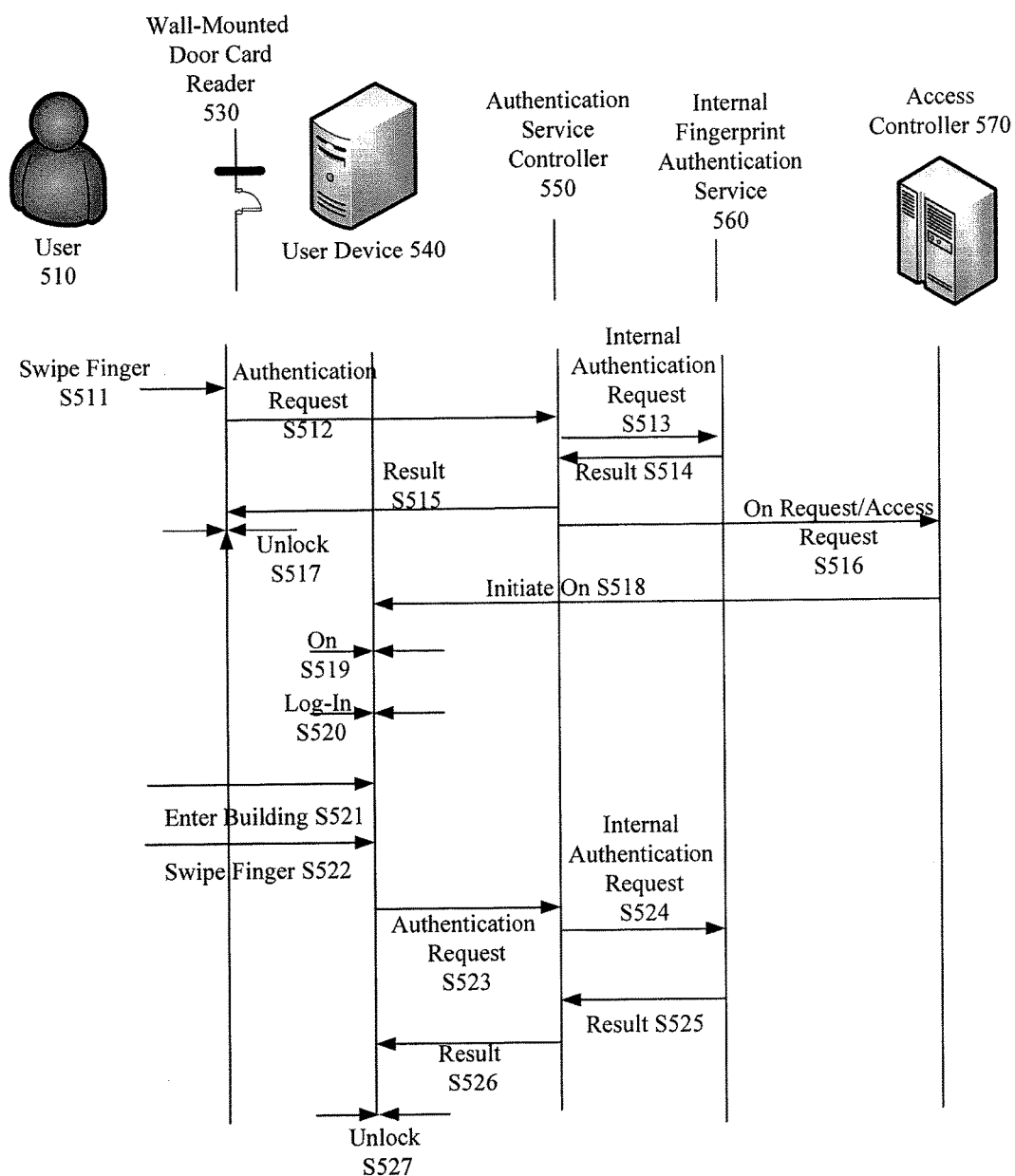
FIG. 5 shows an exemplary process flow for networked device access control, according to an aspect of the present disclosure.

FIG. 5 shows an exemplary process flow for networked device access control, according to an aspect of the present disclosure. In the view of FIG. 5, a user 510 initially swipes a finger at wall-mounted door card reader 530 in S511. The wall-mounted door card reader S530 sends an authentication request to authentication service controller 550 at S512. Authentication service controller 550 sends an internal authentication request to internal fingerprint authentication service 560 at S513. That is, authentication service controller 550 in FIG. 5 is used to intermediate checkpoint systems and the fingerprint authenticate service 560.

The authentication service may be provided internally by the entity that provides the checkpoint security systems and workstation security systems, or may be provided as an independent service such as a subscription service such that authentication requests are sent external to a facility. For example, a centralized biometric authentication service may be provided on-demand or as a subscription to authenticate users at checkpoints and/or at workstations in order to initiate start-up and/or login and/or to provide final access to a logged-in workstation computer.

At S514, internal fingerprint authentication service 560 sends an authentication result to authentication service controller 550. The result is sent from the authentication service controller 550 to the wall-mounted door card reader 530 at S515 as an instruction to allow the user to proceed, and the checkpoint (door) is unlocked at S517 based on the result.

At S516, authentication service controller 550 sends an on request/access request to access controller 570. The access controller 570 initiates "on" at the user device 540 at S518, and the user device 540 is turned on at S519. At S520, the user device is logged in.

At S521, the user enters the building and travels to the user device 540. At S522, the user swipes a finger at the user device 540, and an authentication request is again sent to the authentication service controller 550 at S523. At S524, the authentication service controller 550 sends an internal authentication request to internal fingerprint authentication service 560. At S525, a result is sent back to the authentication service controller 550, and the result is passed to the user device 540 as an instruction at S526. At S527, the device is unlocked from the protected state and the user is provided access.

Figure 6:
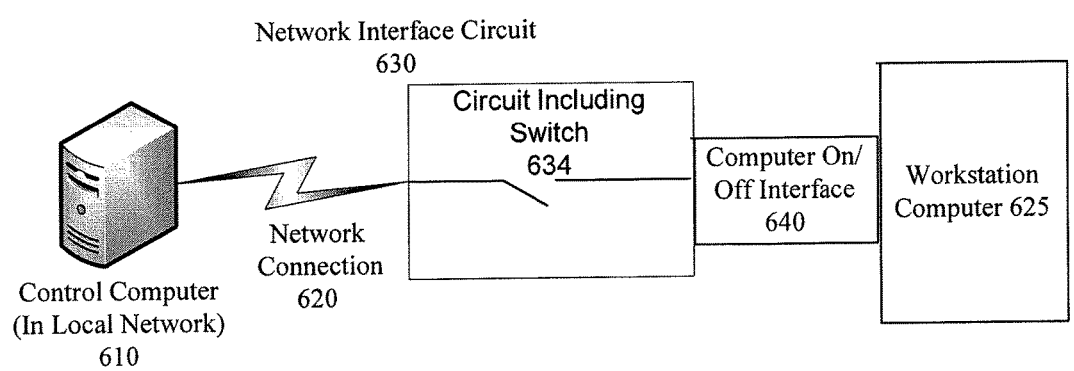
FIG. 6 shows an exemplary system for networked device access control, according to an aspect of the present disclosure.

FIG. 6 shows an exemplary system for networked device access control, according to an aspect of the present disclosure. In FIG. 6, a control computer 610 in a local network sends a signal over network connection 620 to network interface circuit 630. The network interface circuit includes a physical switch 634 that physically switches a workstation computer 625 on or off via computer on/off interface 640.

Figure 7:
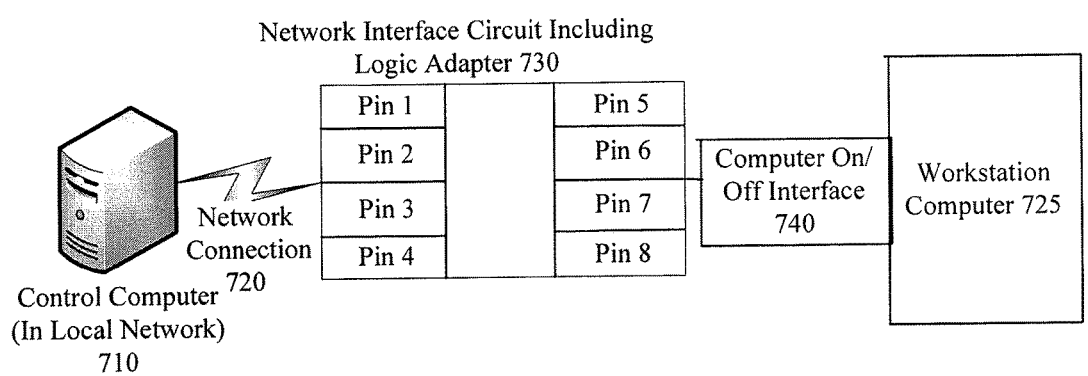
FIG. 7 shows an exemplary system for networked device access control, according to an aspect of the present disclosure.

FIG. 7 shows an exemplary system for networked device access control, according to an aspect of the present disclosure. In FIG. 7, a control computer 710 in a local network sends a signal over network connection 720 to network interface circuit including logic adapter 730. The logical adapter is a multi-pin logical adapter that logically switches a workstation computer 725 on or off via computer on/off interface 740.

In FIG. 6 and FIG. 7, a signal sent from a checkpoint is used ultimately to switch a workstation computer on or off. The signal may be generated upon authentication of a user at a checkpoint, and may be sent directly to the workstations or indirectly via a central control computer that controls access to multiple workstations. The central control computers 610, 710 provide functionality previously ascribed to the checkpoint wall-mounted door card reader 210 in FIG. 2, such as confirming authentication, determining which workstation corresponds to a user, and identifying which applications should be logged on for a particular user. The central control computers 610, 710 may store usernames and passwords for the user to log on to operating systems of the respective workstations, as well as any required login information needed for a user to login to a set of applications on a workstation.

Figure 8:
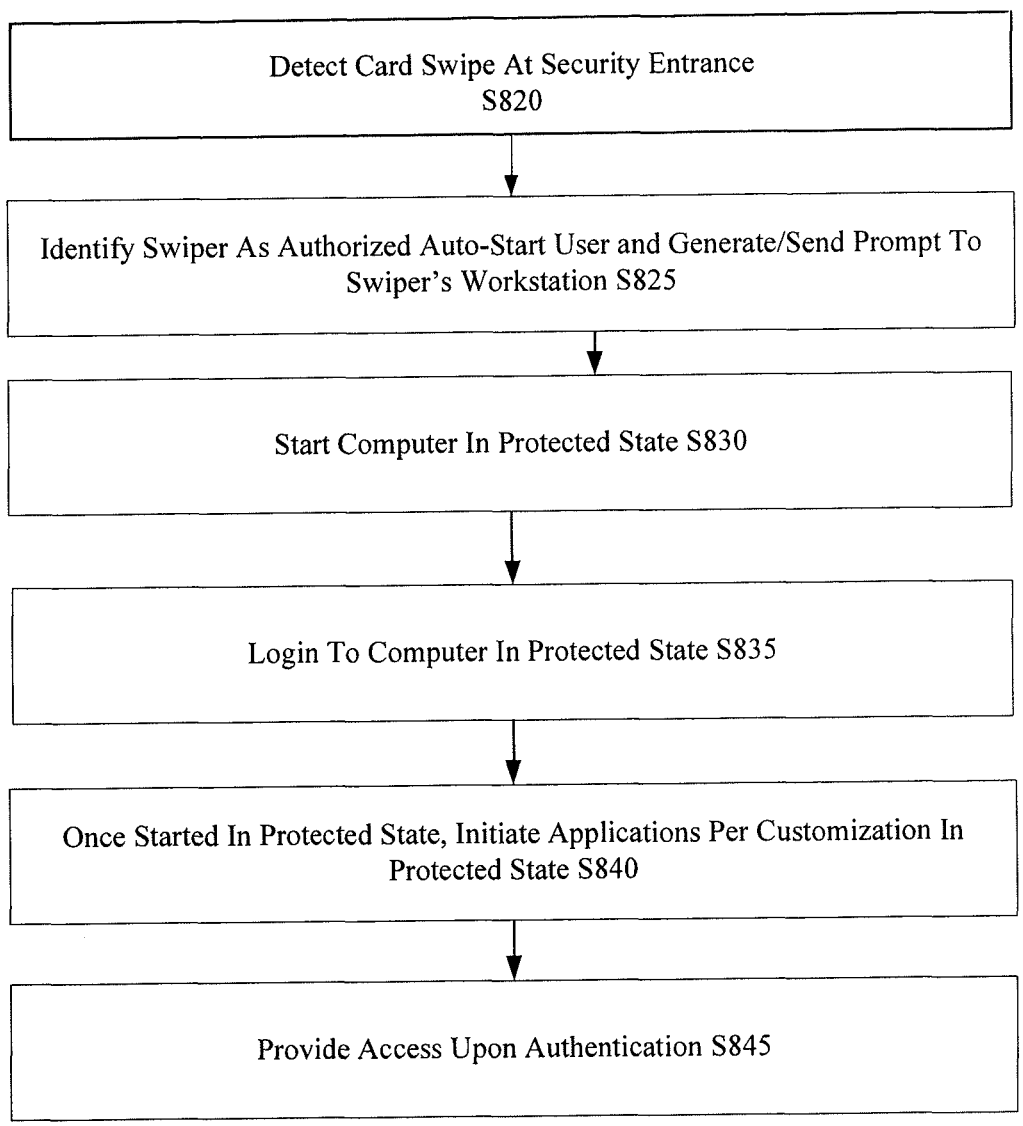
FIG. 8 shows an exemplary process for networked device access control, according to an aspect of the present disclosure.

FIG. 8 shows an exemplary process for networked device access control, according to an aspect of the present disclosure. A card swiped at a security entrance is detected at S820. At S825, the swiper is identified as an authorized auto-start user, and a prompt is generated and sent to the swiper's workstation at S825. At S830 the user's workstation computer is started in a protected state. At S835, the user's workstation computer is logged in in the protected state. At S840, applications are initiated on the user's workstation computer in the protected state per predetermined customization settings. Access to the user's workstation computer is afterwards provided to the user upon authentication at S845.

In the embodiment of FIG. 8, the customization of application sets may differ for different users. For example, one user may provide call center services relating to tax services in Spanish, and may use applications relating to providing tax services in Spanish. Another user may provide services relating to technical support for a cable company. The application sets that are logged on may be preset differently for different users, such that different users will arrive to different workstation configurations when their respective workstations are unlocked.

Figure 9:
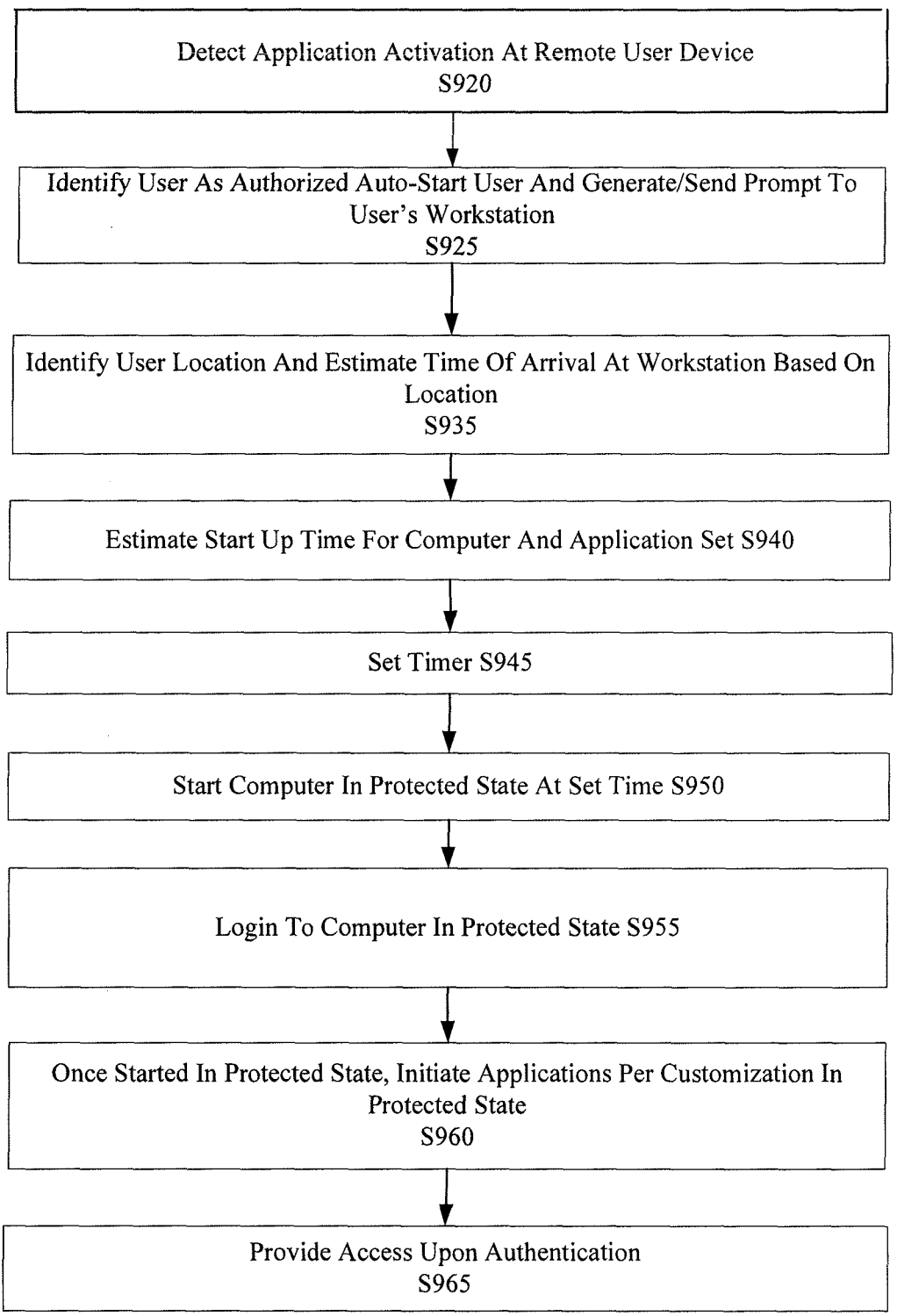
FIG. 9 shows an exemplary process for networked device access control, according to an aspect of the present disclosure.

FIG. 9 shows an exemplary process for networked device access control, according to an aspect of the present disclosure. At S920, activation of an application is detected at a remote user device. In the embodiment of FIG. 9, instead of a facility checkpoint, a user may install a remote log-in/start-up from an application installed on a remote user device such as a smart phone or tablet computer.

At S925, the user is identified as an authorized auto-start user, and a prompt is generated and sent to the user's workstation. At S935, the user's location is identified, and a time of arrival at the user's workstation is estimated based on the location. In this embodiment, a remote start-up and/or login may be delayed from the time of an initial trigger until the estimated time of arrival is within an estimated window for how long it will take the computer to start up and/or login. For example, if a user activates an application when leaving home, and is expected to travel for ½ hour before reaching the user workstation, the process for starting up and logging in to the workstation may be delayed until 10 minutes before the estimated arrival when 10 minutes is within the estimated window for how long it will take the computer to start up and/or login. The location may be estimated at S935 from global positioning satellite (GPS) readings on the remote user device, or from network location readings provided by a wireless service provider network used by the remote user device connected to a wireless network.

A remote login application on a user device may also be integrated with location applications and/or traffic applications. For example, a traffic application may be used to adjust login start times based on traffic conditions, so that even a workstation in a protected state is not left unattended for too long. A traffic and/or location application may also automatically trigger the remote login, such as when a user sets a traffic application to provide directions for "Work" or "Home". In the example of "Work", the smartphone may be set to automatically initiate the remote authenticated login procedures for a workstation computer. As described herein, such procedures may also vary based on traffic conditions, distance from the workstation, and estimates of time of arrival of the authenticated user. Such applications may be provided with automobiles as software installed and integrated with the automobiles rather than with a particular user device personal to a user.

At S940, the start-up time for the computer and application set are estimated. That is, the amount of time it will take for the computer to start and login are estimated, along with the time it will take for the user's application set to login. At S945, a timer is set. At S950, the computer is started in the protected state at the set time. At S955, the computer is logged in in the protected state. At S960, applications are initiated per the customization described herein in the protected state. Access is provided upon authentication of the user at S965.

Figure 10:
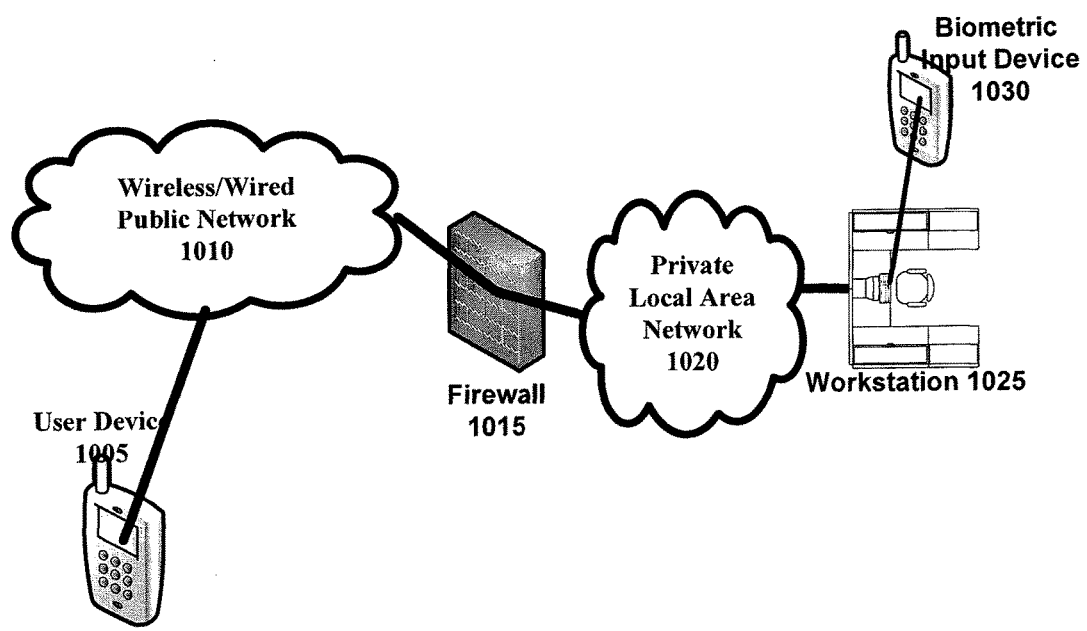
FIG. 10 shows an exemplary system for networked device access control, according to an aspect of the present disclosure.

FIG. 10 shows an exemplary system for networked device access control, according to an aspect of the present disclosure. In the embodiment of FIG. 10, the user device 1005 communicates over wireless/wired public networks 1010. Public networks may include the public wired internet, cellphone and wireless data networks 1010, and the public switched telephone network (PSTN). The user device 1005 communicates via the public networks 1010 through a firewall 1015 to a private local area network 1020. The user's workstation 1025 is connected to the private local area network 1020, so that the start and login prompts for the workstation 1025 can be sent from the user device 1005 to the workstation 1025 or a controller that controls the start and login procedures for the workstation 1025. A biometric input device 1030 is integral with, connected to, or in direct communication with the workstation 1025. Therefore, in the embodiment of FIG. 10, a user may initiate a workstation 1025 start-up and/or login in a protected state from user device 1005, and then unprotect the workstation 1025 upon authentication using the biometric input device 1030 when the user arrives at the workstation 1025.

Figure 11:
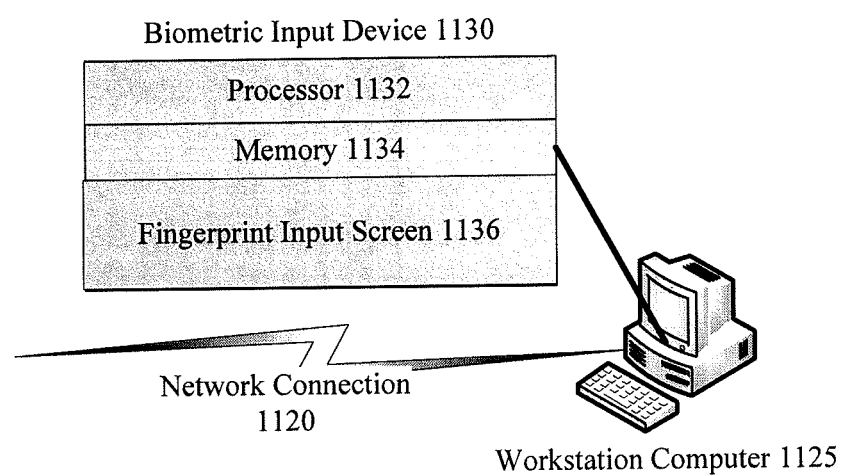
FIG. 11 shows an exemplary system for networked device access control, according to an aspect of the present disclosure.

FIG. 11 shows an exemplary system for networked device access control, according to an aspect of the present disclosure. In the embodiment of FIG. 11, a biometric input device 1130 is shown to include a processor 1132, a memory 1134 and a fingerprint input screen 1136. The biometric input device 1130 is attached to or in direct communication with workstation 1125. Biometric input to the biometric input device 1130 is used to authenticate users, and the workstation computer 1125 is only placed in an unprotected state once the authentication of the user is received from biometric input device 1130. As shown in FIG. 11, the workstation computer 1125 is connected to a network using network connection 1120, and the connection may be used to provide features described in previous embodiments, including the remote start-up and/or login requests.

In the embodiments of FIGS. 10 and 11, a user device 1005 such as a smart phone has an application for remotely initiating computer resources stored thereon. In this way, a user may login to the application on the user device 1005, and request that a workstation computer or other dedicated user resources be turned on and/or logged in. The application on the user device 1005 may even be programmed to automatically initiate the dedicated user resources, for example as the user device 1005 is traveling from the user's home to the user's workplace or at a particular time when the user works on a fixed schedule. An algorithm on the application may check the user's work schedule, the user's location, the time and day, current traffic conditions and the proximity of the user's location to the user's workplace, and time when to initiate the start and/or login procedures described herein.

Figure 12:
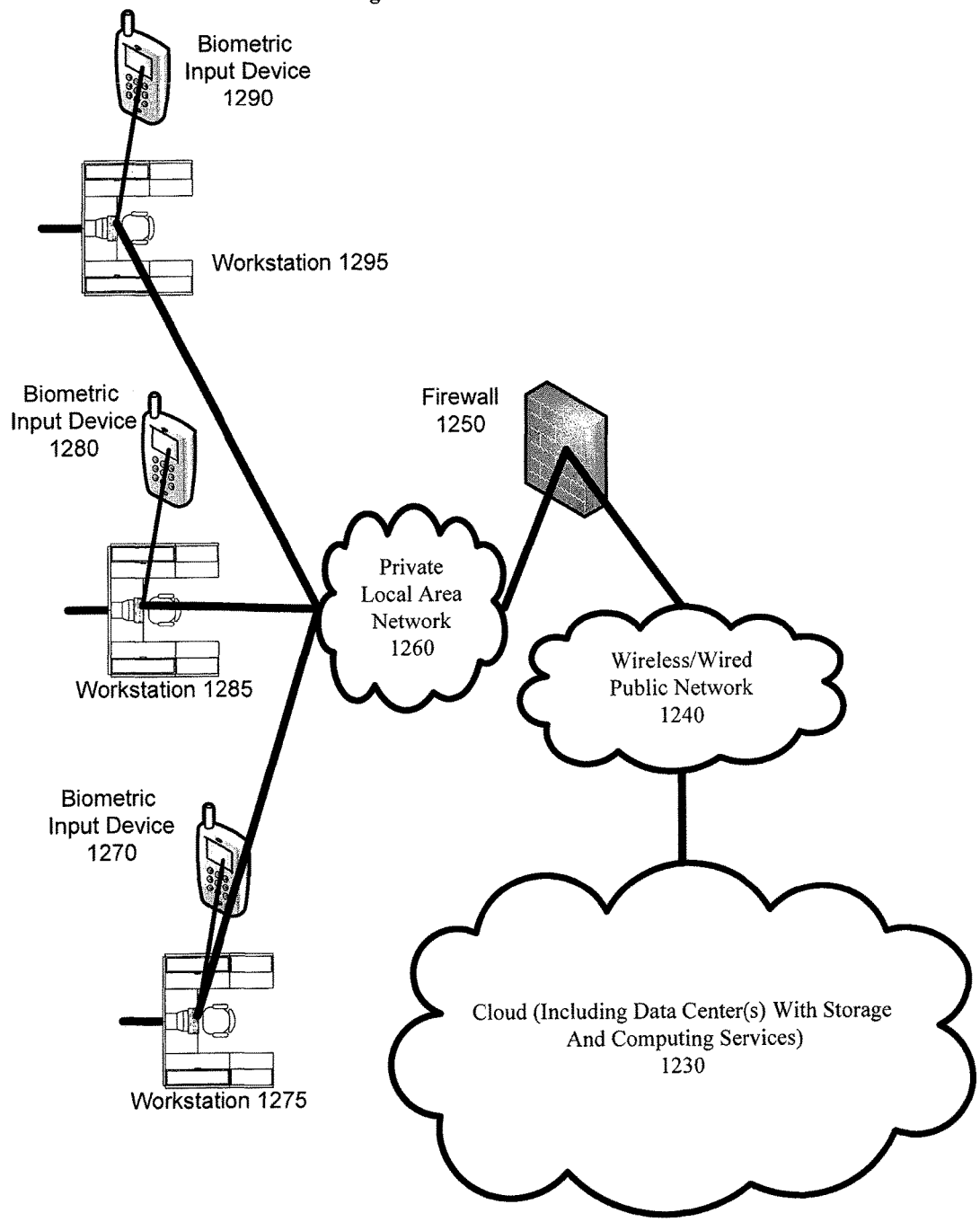
FIG. 12 shows an exemplary network for networked device access control, according to an aspect of the present disclosure.

FIG. 12 shows an exemplary network for networked device access control, according to an aspect of the present disclosure. In FIG. 12, user workstations 1295, 1285 and 1275 are provided together in a private local area network 1260. An exemplary local area network 1260 in FIG. 12 is provided in a call center, and user workstations 1295, 1285 and 1275 are workstations at the call center. Workstation 1295 is provided with a biometric input device 1290. Workstation 1285 is provided with a biometric input device 1280. Workstation 1275 is provided with a biometric input device 1270. The biometric input devices 1270, 1280, 1290 may be used to capture fingerprint, iris scan, voice print, or other forms of biometric samples from users before unlocking/unprotecting the respective workstations 1275, 1285, 1295 shown in FIG. 12.

In FIG. 12, the private local area network 1260 is protected from unauthorized wireless/wired public network intrusions by firewall 1250. A cloud 1230 includes data centers with storage and computing (processing) services in FIG. 12, and is connected to the wireless/wired public network 1240. In the embodiment of FIG. 12, virtual desktop profiles for users may be stored and configured in the cloud, so that users can login to the profiles and associated applications remote from the workstations at which the user will ultimately arrive. In the embodiment of FIG. 12, the user can remotely request that the virtual desktop profile be activated in the cloud 1230. The virtual desktop profile can then be downloaded through the public network 1240 when the user arrives at a workstation 1275, 1285 or 1295. In this way, the start-up and/or login procedures are not associated with a particular workstation, and the resources of the virtual desktop profile dedicated to the user are not downloaded to a particular workstation 1275, 1285 or 1295 until the user arrives at the workstation 1275, 1285 or 1295 and is authenticated. Additionally, some or even most of the processing and memory required to provide the virtual desktop may be retained in the cloud 1230 even after the user arrives at the workstation 1275, 1285, 1295, so that the virtual desktop is provided as distributed functionality. In this way, a user may obtain dedicated resources that, in some instances, require intense memory and processing capacity to initiate, and part of the user's virtual desktop is hosted in the cloud 1230.

Alternative to the use of external cloud resources in FIG. 12, a facility such as a call center may have a mainframe. Workstations may retrieve agent profiles and applications from the mainframe when users login to the workstations. In this alternative to the embodiment of FIG. 12, the dedicated user resources that are turned on, logged in, activated, and/or otherwise initiated based on a trigger may be on a particular workstation and/or on the mainframe. When the user is remotely authenticated or otherwise triggers a prompt, the dedicated user resources are prepared for the arrival of the user locally at the workstation to be used.

In the embodiment of FIG. 12, a particular resource may be allocated to a user only temporarily, such as when a call center workstation is used by different users on different shifts and at different times. In these circumstances, a user may already be logged in to a workstation working when another user who is scheduled to use the workstation on the next shift wishes to configure the workstation for their arrival. In this case, a control computer may hold the request for the arriving user, and prevent the current user from shutting the workstation down upon completion of their shift. For example, the control computer may restart the workstation in a protected state, or may log the current user out at quitting time, and then log the arriving user in in a protected state.

The embodiment of FIG. 12 also supports mobility in the workforce, where workers can login to the operating system and applications required for work remotely before arriving at the workstation where the workers will work. In this way, employees at a call center can login to their virtual desktop before the employees are even assigned to a particular workstation for a shift, and then the parts/components of the virtual desktop that are stored and/or run on a workstation are downloaded to the workstation once the user arrives at the workstation. Of course, the use of the cloud 1230 for storing and running virtual desktops is not limited to call center or single-location entities. Rather, users may use workstations anywhere with access to the cloud storage and processing in order to download the parts/components of the virtual desktop that are stored and/or run on a workstation.

In embodiments involving virtual desktops and virtual computing resources, some or even most of the memory and processing requirements for a user may be executed away from the workstation attended by the user, so that the workstation may be provided mainly for input and output whereas storage and execution are provided externally. In these circumstances, the remote login may be to resources such as applications and a profile implemented (executed, stored) on a server, a mainframe, in a cloud environment. The user accesses the applications and profile at the user workstation upon providing a biometric sample, but the configuration prepared for the user is prepared on the server or mainframe, or in the cloud environment. The parts such as graphics and output to be implemented on the user workstation are downloaded to the workstation upon local authentication of the user.

Another example of use for networked device access control is a testing facility. In this example, students scheduled to take tests at testing workstations have the tests and programs they will use prepared for a test workstation while they are signing in. In this way, for example, workstations can be configured and reconfigured quickly for different arriving users to take different tests that may require different applications.

Figure 13:
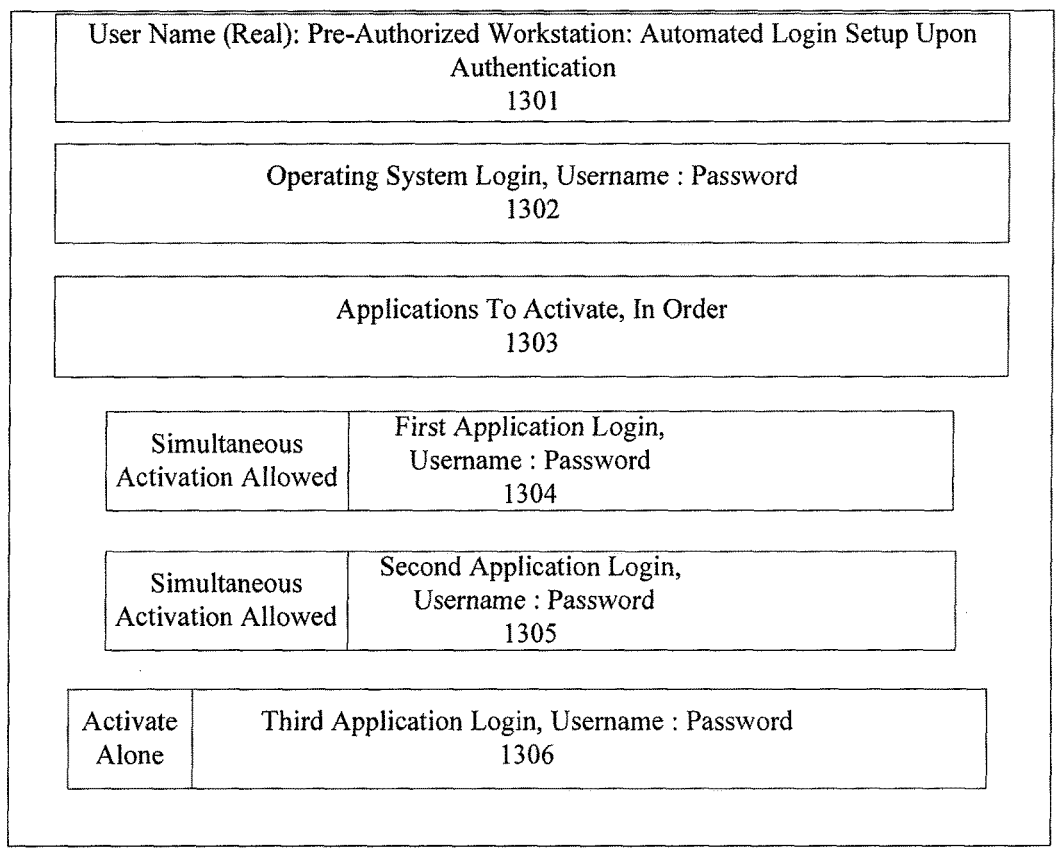
FIG. 13 shows an exemplary memory arrangement for networked device access control, according to an aspect of the present disclosure.

FIG. 13 shows an exemplary memory arrangement for networked device access control, according to an aspect of the present disclosure. In FIG. 13, automated login memory arrangement 1300 includes an area 1301 that stores a user's real name, a pre-authorized workstation, and an automated login setup to be used upon authentication. Area 1302 stores an operating system login, including username and password. Area 1303 stores a list of applications to activate upon login, and the order in which the applications are to be activated. Area 1304 stores a first application's login information, including username and password. Area 1305 stores a second application's login, including username and password. Areas 1304 and 1305 also store information that indicates that the first and second applications can be simultaneously activated. Area 1306 stores a third application's login, including username and password.

Figure 14:
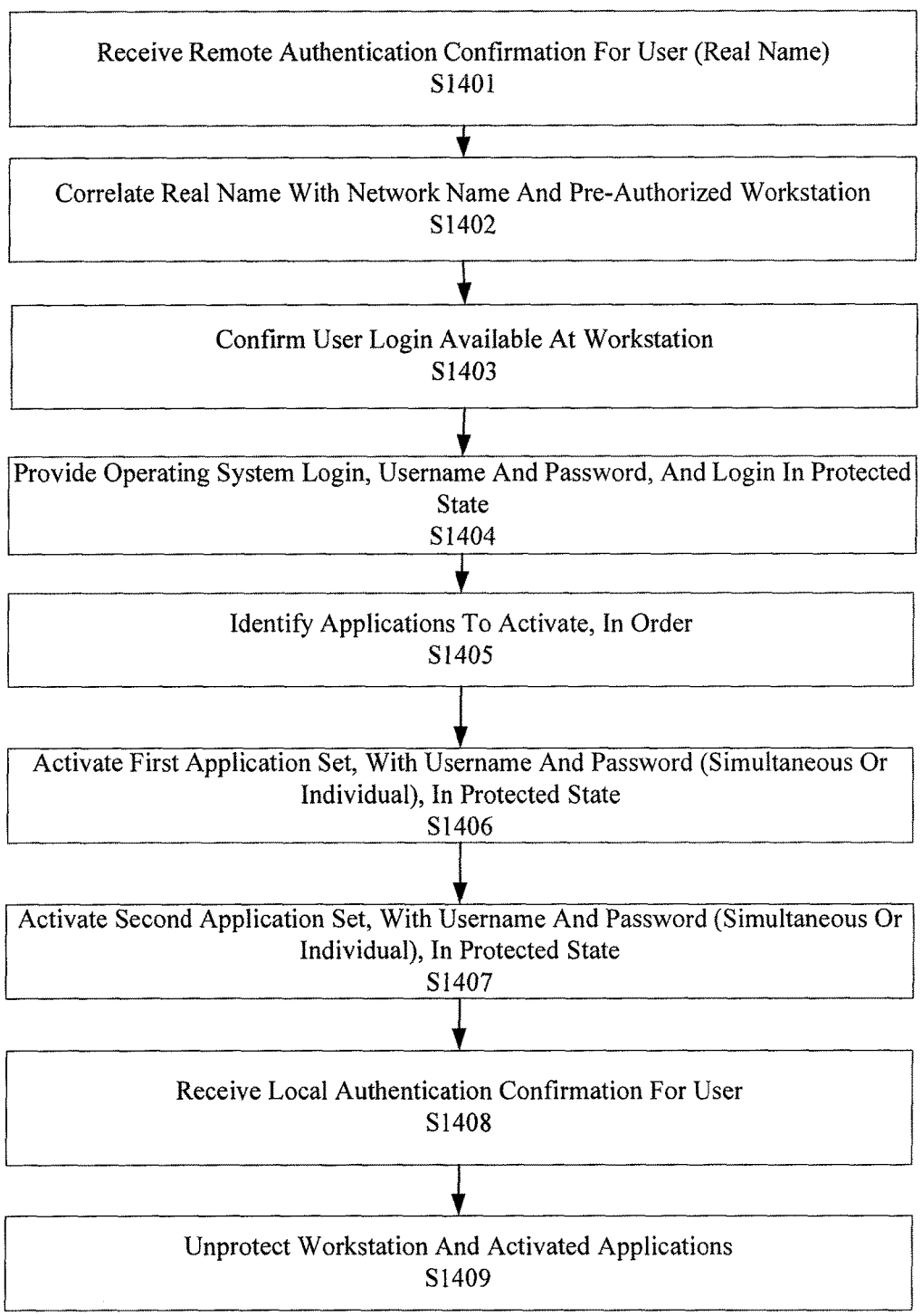
FIG. 14 shows an exemplary process for networked device access control, according to an aspect of the present disclosure.

FIG. 14 shows an exemplary process for networked device access control, according to an aspect of the present disclosure. In the process of FIG. 14, a remote authentication confirmation is received from a user at S1401. The remote authentication confirmation corresponds to the user's real name, as the authentication requires confirmation of the user's identity. The user's identity is correlated with the user's network name and a pre-authorized workstation at S1402, and at S1403 confirmation of the availability of the workstation for a new login is confirmed. At S1404, the operating system of the workstation is logged in, using the username and password, in a protected state. At S1405, applications to activate are identified, in the order in which they will be activated. At S1406, a first application set is activated, with username(s) and password(s), in a protected state. Applications in the first application set may be activated simultaneously, or individually, in accordance with preset information governing the login procedures. At S1407, a second application set is activated, with username(s) and password(s), in a protected state. As with the first application set, applications in the second application set may be activated simultaneously, or individually, in accordance with preset information governing the login procedures.

At S1408, local authentication confirmation is received for the user when the user authenticates the user's identity at the workstation. Local authentication at or around the workstation may be biometric authentication, or authentication using an electronic smart card. At S1409, the workstation and activated applications are unprotected.

Figure 15:
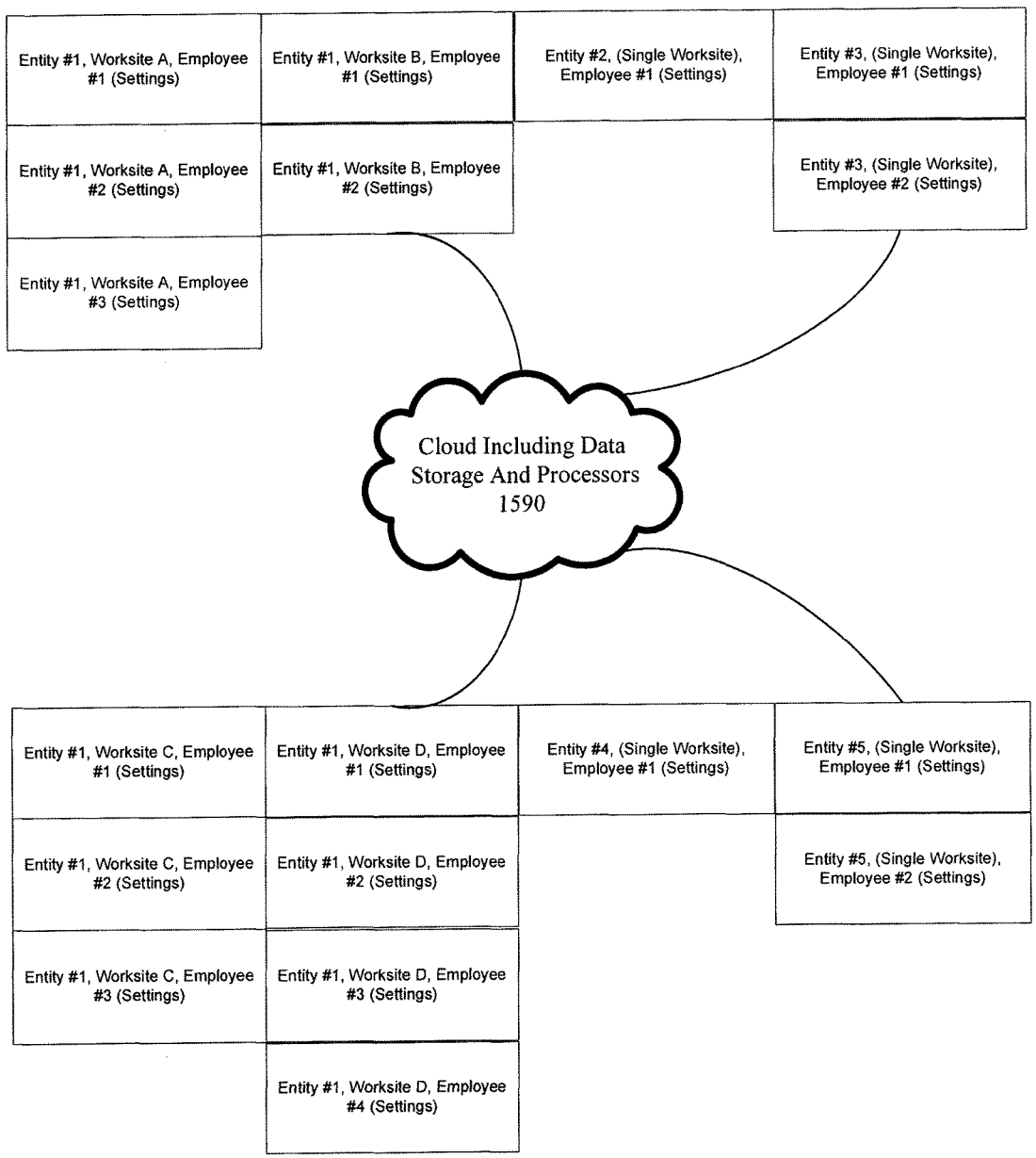
FIG. 15 shows an exemplary memory arrangement for networked device access control, according to an aspect of the present disclosure.

FIG. 15 shows an exemplary memory arrangement for networked device access control, according to an aspect of the present disclosure. In the memory arrangement 1500 in FIG. 15, settings for entities, entity worksites, and entity worksite employees are stored in the cloud 1590. In the embodiment of FIG. 15, security settings are stored centrally for multiple entities, worksites and employees; so that when a user is remotely authenticated in any manner described herein, the user settings can be retrieved and used to start-up and/or login the user to the workstation assigned to the user at a worksite.

In the embodiment of FIG. 15, automated login can be provided as an independent service for multiple different entities. Entities can register workforce settings for users, and enable the users to remotely start-up and login to workstations when entering worksites, or even using personal communications devices such as smart phones. The users may be first authenticated remotely from their dedicated workstations and then authenticated again once they arrive at their assigned workstation. As noted with respect to several embodiments, the logins may be for virtual desktop configurations in a cloud rather than a literal desktop, so that when the user arrives at a workstation, the parts of the virtual desktop that are implemented on the workstation are ready to be downloaded to the workstation.

Figure 16:
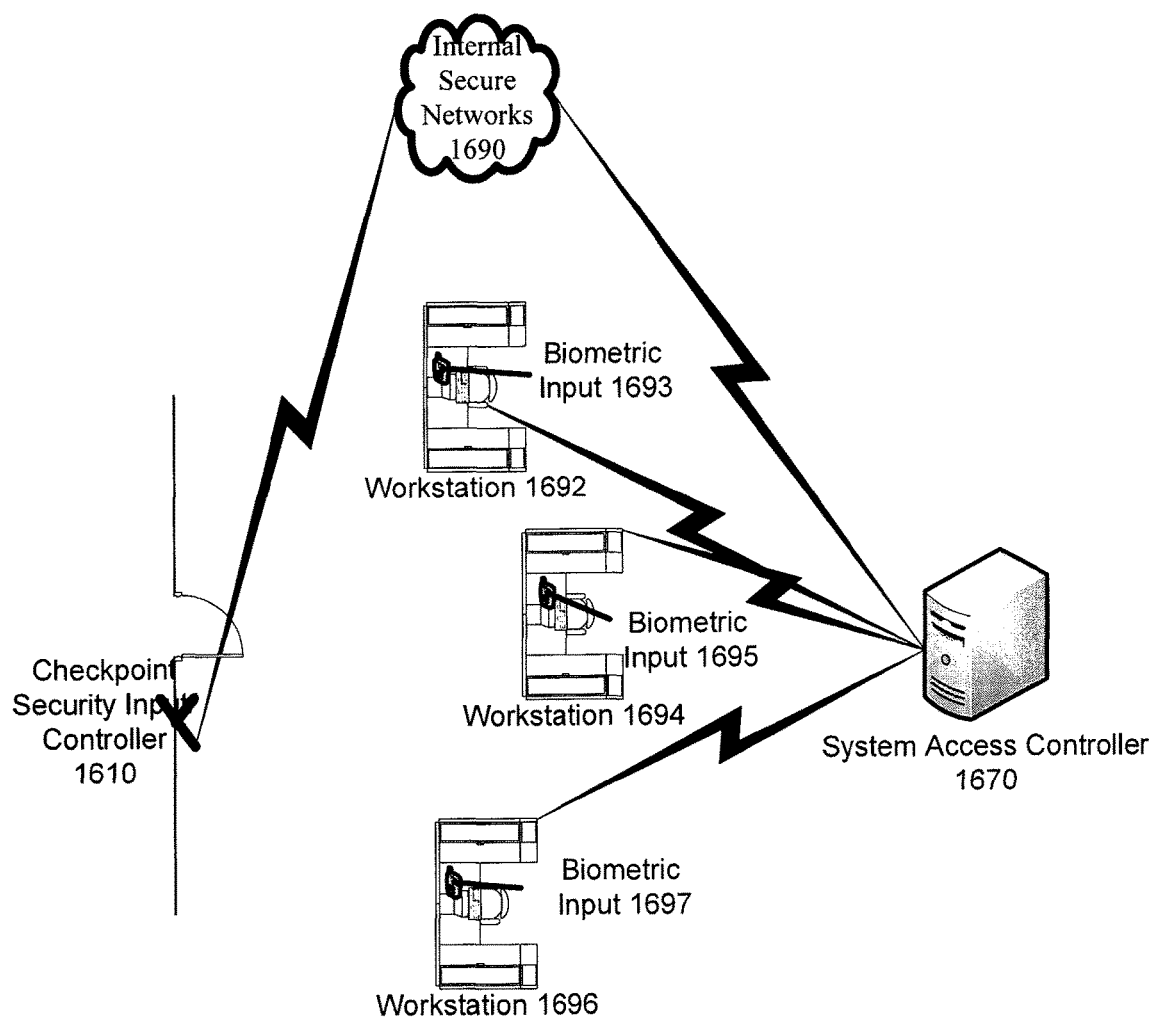
FIG. 16 shows an exemplary network for networked device access control, according to an aspect of the present disclosure.

FIG. 16 shows an exemplary network for networked device access control, according to an aspect of the present disclosure. In the embodiment of FIG. 16, a system access controller 1670 controls physical access at the checkpoint and logical access to workstations 1692, 1694, 1696. A checkpoint security input controller 1610 may include a card reader, or a biometric input, and send collected readings/input over an internal secure network 1690 to the system access controller 1670. The system access controller 1670 determines whether to authenticate the user, and sends the determination back to the checkpoint security input controller 1610. In the same timeframe, the system access controller 1670 initiates the start-up or logon for the workstation 1692, 1694, 1696 to be used by the authenticated user. When the user arrives at the workstation 1692, 1694, 1696, the user uses a biometric input 1693, 1695 or 1697 to authenticate his presence locally at the workstation 1692, 1694, 1696.

Figure 17:
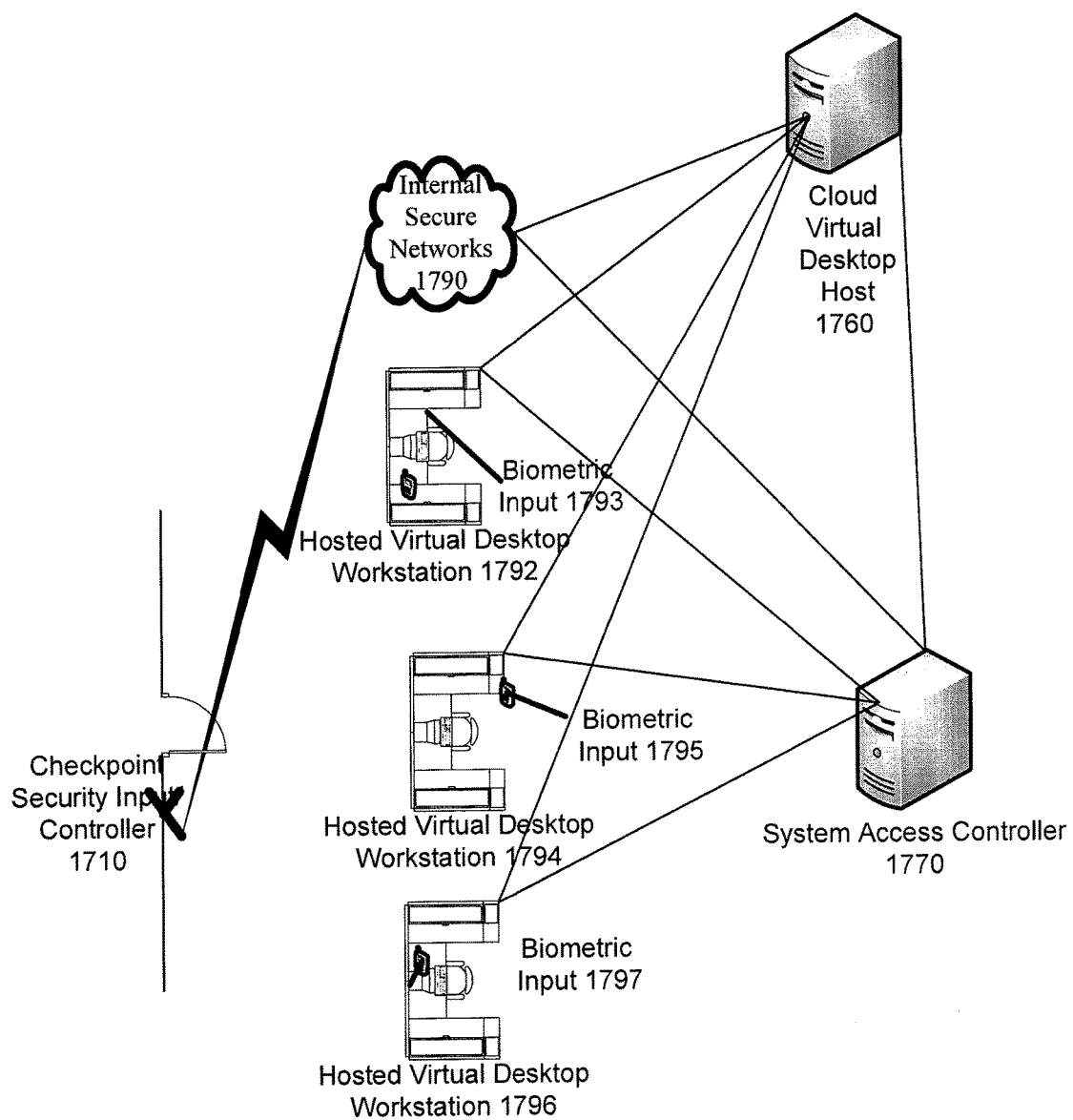
FIG. 17 shows an exemplary network for networked device access control, according to an aspect of the present disclosure.

FIG. 17 shows an exemplary network for networked device access control, according to an aspect of the present disclosure. In the embodiment of FIG. 17, a cloud virtual desktop host 1760 is provided so that the initial login is to dedicated virtual desktop resources in the cloud. The dedicated virtual desktop resources are a profile and set of applications used by a user. The cloud virtual desktop host 1760 logs the user into the profile and the set of applications based on the initial authentication at the checkpoint, and then downloads the parts of the profile and applications that will be implemented on the workstations once the user arrives at the workstation and is authenticated locally.

In embodiments described herein, users may have several different profiles associated with their identity, such as when different configurations and options can be presented to the users. A user may be asked to choose their profile, or particular options such as applications to login to, when the user is remotely identified at, e.g., a checkpoint or on a smartphone using a remote start-up/login application. For example, a user may be asked to select from login options for different applications on the user's workstation computer at the time the user is first remotely identified. The options presented to the user may be predefined by the user, and may also include a default configuration of applications to be logged in if no selection is made by the user.

In FIG. 17, the cloud virtual desktop host 1760 may communicate with the system access controller 1770, so as to confirm when the user is authorized to access a workstation 1792, 1794, 1796 based on authentication using biometric inputs 1793, 1795, 1797. The system access controller 1770 or another device may also time-out a workstation 1792, 1794, 1796 if a user does not arrive to authenticate the local presence within an expected time frame, and then communicate to the cloud virtual desktop host 1760 that the configuration prepared for the user can be disabled. The time-out may be variable and programmable, such as to be personalized differently for different users under a single entity or at a single facility, and customized differently for different entities and facilities.

Of course, a time-out may be provided in any embodiment herein for when a user does not arrive to access a workstation within an expected timeframe. Moreover, although the access controls described herein are primarily described as automated processes, exceptions may also be provided, such as when a user checks in to work outside of their schedule. Users may be restricted to the remote protected access described herein only when they are scheduled to work, and not for visits to, e.g., pick up a paycheck or visit human resources. Thus, users may both be timed-out when they do not arrive locally to a workstation within an expected window, and prevented from the remote initiation described herein when they arrive to a facility or activate an access application at a time when they are not expected or scheduled.

Accordingly, the present disclosure enables networked device access control remotely, so that dedicated user resources such as a workstation, a virtual desktop, an individual application, or other kinds of resources can be started up and logged in remotely before a user arrives to their workstation. As noted, in embodiments where dedicated user resources are hosted virtually in a cloud or other external system, the user's work environment may be prepared for the user even when the user is not yet assigned a particular workstation. Thus, in a call center environment, users can be logged into resources upon arrival at a checkpoint, and then assigned to a workstation after the dedicated user resources are already being prepared for use. Once the user signs into a workstation, the portions of the virtual desktop that will be used by the user are downloaded for implementation on the workstation. The automated remote login to the cloud resources in the manner described herein is the same type of login that would occur if the user were not provided with the networked device access control herein and were instead only logging in to dedicated resources once they arrive at their workstation. A key difference however is that the portions of the cloud resources that are to be downloaded to the workstation are ready, or closer to being ready, to be downloaded to the workstation when the user arrives at the workstation and provides the local authentication to unlock the workstation.

Though different features have been described with respect to different embodiments in the present disclosure, such features may be provided together in the same embodiments when compatible. For instance, one or more security services may be provided internal or external to an organization or facility to confirm biometric samples or scans or to check electronic smart card submissions against lists of pre-authorized users and their workstations or other dedicated user resources. Additionally, one or more access controllers may be provided internal or external to an organization or facility, to coordinate physical access to checkpoints and to coordinate logical access to workstations and other computing resources such as applications. Moreover, cloud or mainframe "virtual" resources may be provided for any embodiment, where the logical access to computing resources is logical access to computing resources implemented partly or fully away from a workstation used by a user. The remote login initiations are provided to be available when the user arrives at a workstation and downloads the parts of the application that are implemented on the user's workstation.

Although examples herein are mainly described with respect to workstations that would be understood to belong traditionally in a workplace, the present disclosure also equally applies to networked computer devices in a home. For instance, smart appliances such as a coffeemaker, a thermostat, a crockpot, a television, or other networked computer devices may be started up and configured remotely by an authenticated user. For instance, a user may remotely set a thermostat, or remotely start a coffeemaker, using a remote authenticated login application on a device. In the example of the thermostat, the thermostat may be turned up in the winter and down in the summer before the user gets home, and other users may be prevented from making changes to the thermostat setting. Additionally, a remote login authentication may be used to initiate several devices, such as a home workstation and a coffeemaker, or a home workstation and a thermostat, each of which will provide immediate access to the user when the user is authenticated locally.

Additionally, although workstations are primarily described as including a computer, workplace devices that are improved by networked device access control described herein include network printers and copiers. For example, a user authorized to remotely start or login to a network printer or network copier used by multiple users may be presented with an option to start a particular network printer or network copier. The user may be presented with the choice to initiate the network printer or network copier when swiping into work at a remote checkpoint security system, or via a user application on the user's communication device prior to leaving for work.

Although networked device access control has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, although the application describes remote start-up, system login, and individual application login, a system may not require remote start-up, and may instead merely benefit from remote system login and/or individual application login. Additionally, while the application describes authentication both remotely at a checkpoint or at a user's personal device, and locally at a workstation, security such as a card swipe or biometric sample may be obtained only remotely or locally, or not even at all.

In accordance with the herein-contained disclosure, a user's confirmed presence in or at a particular space, or within a particular geography or geographical range, is tied to the behavior of computer resources and applications dedicated or to be dedicated to the user. Geographical presence can be confirmed at a fixed location, such as a checkpoint, or based on global positioning satellite (GPS) readings, presence in a local network such as a particular wireless fidelity (WiFi) network, proximity to a particular wireless receiver, or other mechanisms of identifying a location. Identity can be confirmed based on possession of a particular item such as a badge or electronic smart card, based on biometric input from a user, based on username and password combinations provided by a user, or by other known forms of identification.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packet switched network transmission represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

As described herein, according to an aspect of the present disclosure, a computer apparatus is remotely initiated by a method. The method includes receiving, over a network, confirmation of a detected and authenticated presence of a user remote from the computer apparatus. A dedicated user resource that will be implemented using the computer apparatus is logged in in a protected workstate that prevents access to the computer apparatus until a local presence of the user is detected and authenticated. The workstate of the computer apparatus is unprotected upon confirmation of the local presence of the user. Access to the user is allowed upon unprotecting the workstate of the computer apparatus.

According to another aspect of the present disclosure, the method also includes logging in to a customized set of applications on the computer apparatus in the protected workstate prior to the confirmation of the local presence of the user.

According to still another aspect of the present disclosure, the confirmation of the detected and authenticated presence of the user remote from the computer apparatus and the confirmation of the local presence of the user are each based upon a biometric input from the user.

According to yet another aspect of the present disclosure, the method includes powering-up the computer apparatus prior to logging in to the computer apparatus and based upon the confirmation of the detected and authenticated presence of the user remote from the computer apparatus.

According to another aspect of the present disclosure, the network includes a private local area network.

According to still another aspect of the present disclosure, the method also includes logging in to multiple of computer apparatuses in a protected workstate that prevents access to the multiple computer apparatuses until a local presence of the user is confirmed. The workstate of the multiple computer apparatuses is unprotected upon confirmation of the local presence of the user. Access to the user is allowed upon unprotecting the workstate of the multiple computer apparatuses.

According to yet another aspect of the present disclosure, the method includes allowing access to another user upon unprotecting the workstate of the computer apparatus.

According to another aspect of the present disclosure, the detected and authenticated presence is at a controlled entrance of a facility, and the computer apparatus is within the facility.

According to still another aspect of the present disclosure, the detected and authenticated presence is authenticated using a biometric input from the user.

According to yet another aspect of the present disclosure, the biometric input is a fingerprint.

According to another aspect of the present disclosure, a security system confirms both the authenticated presence of the user remote from the computer apparatus and the local presence of the user at the computer apparatus.

According to still another aspect of the present disclosure, the logging in to the computer apparatus in a protected workstate is automatically performed based on receiving confirmation of the detected and authenticated presence of the user remote from the computer apparatus.

According to yet another aspect of the present disclosure, the logging in to the computer apparatus in a protected workstate is performed based on receiving confirmation of the detected and authenticated presence of the user remote from the computer apparatus and based on confirmation from the user that the logging in should be performed.

According to another aspect of the present disclosure, the detected and authenticated presence of the user remote from the computer apparatus is detected and authenticated at an entrance to a facility that contains the computer apparatus.

According to still another aspect of the present disclosure, the method also includes provisioning the computer apparatus from a cloud network in accordance with a profile for the user following and based on logging in to the computer apparatus in the protected workstate.

According to yet another aspect of the present disclosure, the method also includes confirming that no other use is logged into and using the computer apparatus prior to logging in to the computer apparatus in the protected workstate.

According to another aspect of the present disclosure, the computer apparatus is used by multiple users.

According to still another aspect of the present disclosure, the computer apparatus is provided in a call center.

According to an aspect of the present disclosure, a tangible computer readable storage medium stores a computer program for remotely initiating a computer apparatus. The computer program, when executed by a processor, causing the computer apparatus to perform a process including receiving, over a network, confirmation of a detected and authenticated presence of a user remote from the computer apparatus. A dedicated user resource that will be implemented using the computer apparatus is logged in in a protected workstate that prevents access to the computer apparatus until a local presence of the user is detected and authenticated. The workstate of the computer apparatus is unprotected upon confirmation of the local presence of the user. Access to the user is allowed upon unprotecting the workstate of the computer apparatus.

According to an aspect of the present disclosure, a computer apparatus includes a memory that stores instructions and a processor that executes the instructions. When executed by the processor, the instructions cause the processor to perform operations including receiving, over a network, confirmation of a detected and authenticated presence of a user remote from the computer apparatus. A dedicated user resource that will be implemented using the computer apparatus is logged in in a protected workstate that prevents access to the computer apparatus until a local presence of the user is detected and authenticated. The workstate of the computer apparatus is unprotected upon confirmation of the local presence of the user. Access to the user is allowed upon unprotecting the workstate of the computer apparatus.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of securely enabling remote computer logins, comprising:
   receiving, via a wireless network, confirmation of a detected and authenticated presence of a user at a fixed remote location away from a computer apparatus;
   initiating booting, based on receiving confirmation of the detected and authenticated presence of the user at the fixed remote location, of the computer apparatus in a protected workstate that prevents acceptance of a key input to the computer apparatus while the user is remote and until a local presence of the user is detected and authenticated;
   receiving biometric information of the user;
   authenticating the local presence of the user based on the biometric information of the user;
   locally logging the user into the computer apparatus to place the computer apparatus in an unprotected workstate, in response to authenticating the local presence of the user;
   accepting a key input, by the computer apparatus in the unprotected workstate;
   making accessible the computer apparatus to the user upon unprotecting of the protected workstate of the computer apparatus;
   initiating booting of a plurality of computer apparatuses in a protected workstate that prevents access to the plurality of computer apparatuses until a local presence of the user is confirmed;
   placing each of the plurality of computer apparatuses in an unprotected workstate upon confirmation of the local presence of the user;
   enabling the user to access, upon unprotecting of the protected workstate, each of the plurality of computer apparatuses; and
   enabling another user to access the computer apparatus when the protected workstate of the computer apparatus is unprotected.

2. The method of claim 1, further comprising:
   logging in, based on the receiving confirmation of the detected and authenticated presence of the user remote from the computer apparatus, to a dedicated user resource that will be implemented using the computer apparatus.

3. The method of claim 1, further comprising:
   logging in to an application on the computer apparatus in the protected workstate prior to the confirmation of the local presence of the user.

4. The method of claim 1, further comprising:
   powering-up the computer apparatus for the initiating booting of the computer apparatus in the protected workstate.

5. The method of claim 1,
   wherein the wireless network comprises a wide area cellular network.

6. The method of claim 1, further comprising:
   providing, via an application installed on a smart phone used by the user, the detected and authenticated presence of the user remote from the computer apparatus.

7. The method of claim 1,
wherein the biometric input is a fingerprint.

8. The method of claim 1,
wherein a security system confirms both the authenticated presence of the user remote from the computer apparatus and the local presence of the user at the computer apparatus.

9. The method of claim 1, further comprising:
receiving confirmation of the detected and authenticated presence of the user remote from the computer apparatus for automatically initiating booting of the computer apparatus in the protected workstate.

10. The method of claim 1, further comprising:
receiving confirmation from the user that the initiating booting should be performed for the initiating booting of the computer apparatus in the protected workstate.

11. The method of claim 10, further comprising:
providing, the confirmation from the user, via an application installed on a mobile device used by the user.

12. The method of claim 1, further comprising:
provisioning the computer apparatus from a cloud network in accordance with a profile for the user following and based on logging in to the computer apparatus in the protected workstate after the booting.

13. The method of claim 1, further comprising:
confirming that no other user is logged into and using the computer apparatus prior to the initiating booting of the computer apparatus in the protected workstate.

14. The method of claim 1,
wherein the computer apparatus is used by multiple users.

15. The method of claim 1,
wherein the computer apparatus is provided in a call center.

16. A non-transitory computer readable storage medium that stores a computer program for securely enabling remote computer logins, the computer program, when executed by a processor, causing a computer apparatus to perform a process comprising:
receiving, via a wireless network, confirmation of a detected and authenticated presence of a user at a fixed remote location away from the computer apparatus;
initiating booting, based on receiving confirmation of the detected and authenticated presence of the user at the fixed remote location, of the computer apparatus in a protected workstate that prevents acceptance of a key input to the computer apparatus while the user is remote and until a local presence of the user is detected and authenticated;
receiving biometric information of the user;
authenticating the local presence of the user based on the biometric information of the user;
locally logging the user into the computer apparatus to place the computer apparatus in an unprotected workstate, in response to authenticating the local presence of the user;
accepting a key input, by the computer apparatus in the unprotected workstate;
making accessible the computer apparatus to the user upon unprotecting of the protected workstate of the computer apparatus;
initiating booting of a plurality of computer apparatuses in a protected workstate that prevents access to the plurality of computer apparatuses until a local presence of the user is confirmed;
placing each of the plurality of computer apparatuses in an unprotected workstate upon confirmation of the local presence of the user;
enabling the user to access, upon unprotecting of the protected workstate, each of the plurality of computer apparatuses; and
enabling another user to access the computer apparatus when the protected workstate of the computer apparatus is unprotected.

17. A computer apparatus, comprising:
a memory that stores instructions for securely enabling remote computer logins, and
a processor that executes the instructions,
wherein, when executed by the processor, the instructions cause the processor to perform operations comprising:
receiving, via a wireless network, confirmation of a detected and authenticated presence of a user at a fixed remote location away from the computer apparatus;
initiating booting, based on receiving confirmation of the detected and authenticated presence of the user at the fixed remote location, of the computer apparatus in a protected workstate that prevents acceptance of a key input to the computer apparatus while the user is remote and until a local presence of the user is detected and authenticated;
receiving biometric information of the user;
authenticating the local presence of the user based on the biometric information of the user;
locally logging the user into the computer apparatus to place the computer apparatus in an unprotected workstate, in response to authenticating the local presence of the user;
accepting a key input, by the computer apparatus in the unprotected workstate;
making accessible the computer apparatus to the user upon unprotecting of the protected workstate of the computer apparatus;
initiating booting of a plurality of computer apparatuses in a protected workstate that prevents access to the plurality of computer apparatuses until a local presence of the user is confirmed;
placing each of the plurality of computer apparatuses in an unprotected workstate upon confirmation of the local presence of the user;
enabling the user to access, upon unprotecting of the protected workstate, each of the plurality of computer apparatuses; and
enabling another user to access the computer apparatus when the protected workstate of the computer apparatus is unprotected.

* * * * *